US011190838B2

United States Patent
Park et al.

(10) Patent No.: US 11,190,838 B2
(45) Date of Patent: Nov. 30, 2021

(54) MULTIMEDIA DEVICE WITH STANDBY MODE AND PROVIDING NOTIFICATION INFORMATION

(71) Applicant: LG ELECTRONICS INC., Seoul (KR)

(72) Inventors: Jaeyoung Park, Seoul (KR); Hyunjung Hong, Seoul (KR); Jihye Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 15/742,785

(22) PCT Filed: Jul. 9, 2015

(86) PCT No.: PCT/KR2015/007149
§ 371 (c)(1),
(2) Date: Jan. 8, 2018

(87) PCT Pub. No.: WO2017/007051
PCT Pub. Date: Jan. 12, 2017

(65) Prior Publication Data
US 2018/0199104 A1 Jul. 12, 2018

(51) Int. Cl.
*H04N 21/443* (2011.01)
*H04N 21/45* (2011.01)
(Continued)

(52) U.S. Cl.
CPC ........... *H04N 21/4436* (2013.01); *H04N 5/63* (2013.01); *H04N 21/4223* (2013.01);
(Continued)

(58) Field of Classification Search
CPC .... H04N 5/4436; H04N 5/44513; H04N 5/63; H04N 21/42201; H04N 21/4223;
(Continued)

(56) References Cited

U.S. PATENT DOCUMENTS

| 4,716,469 A | * | 12/1987 | Kim | ................. G01S 17/02 340/557 |
| 8,965,170 B1 | * | 2/2015 | Benea | ................. H04H 60/33 386/224 |

(Continued)

FOREIGN PATENT DOCUMENTS

| JP | 2014-44496 A | 3/2014 |
| KR | 10-1998-037135 A | 8/1998 |

(Continued)

OTHER PUBLICATIONS

Kim, "TV Capable of Checking Laundry Time, Controlling Temperature of Air Conditioner and etc.," Korea Joong Ang Daily, Aug. 21, 2014, pp. 1-3 (4 pages total), with a partial English translation.

*Primary Examiner* — John W Miller
*Assistant Examiner* — Omer Khalid
(74) *Attorney, Agent, or Firm* — Birch, Stewart, Kolasch & Birch, LLP

(57) ABSTRACT

A multimedia device capable of providing notification information for each user in a standby mode is disclosed. The multimedia device according to one embodiment of the present invention comprises: a control unit entering the standby mode when the multimedia device is turned off; a notification information collection unit for collecting notification information from at least one of a broadcasting station, an external device, and an external server when the multimedia device has entered the standby mode; a sensing unit for acquiring user information and information of distance with the user when the multimedia device has entered the standby mode; and a display unit, wherein, when a user recognized on the basis of the acquired user information corresponds to a preset user, and when the acquired information of distance with the user corresponds to a preset distance value, the control unit activates a partial region of the display unit and displays, on the activated partial region, (Continued)

notification information corresponding to the recognized user from among the pieces of collected notification information.

16 Claims, 15 Drawing Sheets

(51) Int. Cl.
| | |
|---|---|
| *H04N 21/422* | (2011.01) |
| *H04N 21/4223* | (2011.01) |
| *H04N 21/442* | (2011.01) |
| *H04N 21/47* | (2011.01) |
| *H04N 5/63* | (2006.01) |
| *H04N 21/488* | (2011.01) |
| *H04W 88/04* | (2009.01) |
| *H04N 21/81* | (2011.01) |
| *H04N 21/478* | (2011.01) |
| *H02M 1/00* | (2006.01) |

(52) U.S. Cl.
CPC . *H04N 21/42201* (2013.01); *H04N 21/44218* (2013.01); *H04N 21/4532* (2013.01); *H04N 21/47* (2013.01); *H04N 21/4882* (2013.01); *H04N 21/8126* (2013.01); *H04N 21/8146* (2013.01); *H04W 88/04* (2013.01); *H02M 1/0032* (2021.05); *H04N 21/478* (2013.01)

(58) Field of Classification Search
CPC ......... H04N 21/44218; H04N 21/4532; H04N 21/4882; H04N 21/8126; H04N 21/8146; H04W 88/04; H04N 2005/44521; H04W 88/04; H02M 2001/0032
USPC .......................................................... 348/563
See application file for complete search history.

(56) References Cited

U.S. PATENT DOCUMENTS

| | | | |
|---|---|---|---|
| 2011/0057796 A1* | 3/2011 | Delore | G08B 25/14 340/565 |
| 2011/0143711 A1* | 6/2011 | Hirson | H04L 63/18 455/410 |
| 2014/0250447 A1* | 9/2014 | Schink | H04N 21/478 725/10 |
| 2015/0091795 A1* | 4/2015 | Kang | G09G 3/3406 345/156 |
| 2015/0201236 A1* | 7/2015 | Al Remeithi | H04N 21/4882 348/77 |

FOREIGN PATENT DOCUMENTS

| | | |
|---|---|---|
| KR | 10-2014-0098516 A | 8/2014 |
| KR | 10-2014-0131782 A | 11/2014 |
| KR | 10-2014-0135029 A | 11/2014 |
| KR | 10-2015-0036931 A | 4/2015 |
| WO | WO 2013/151232 A1 | 10/2013 |

\* cited by examiner

FIG. 9
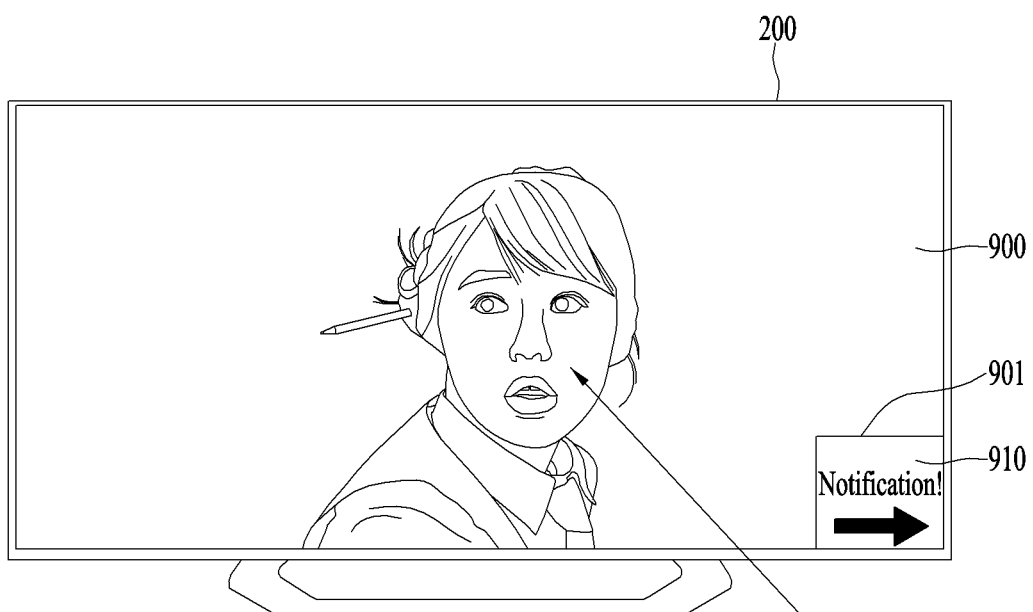
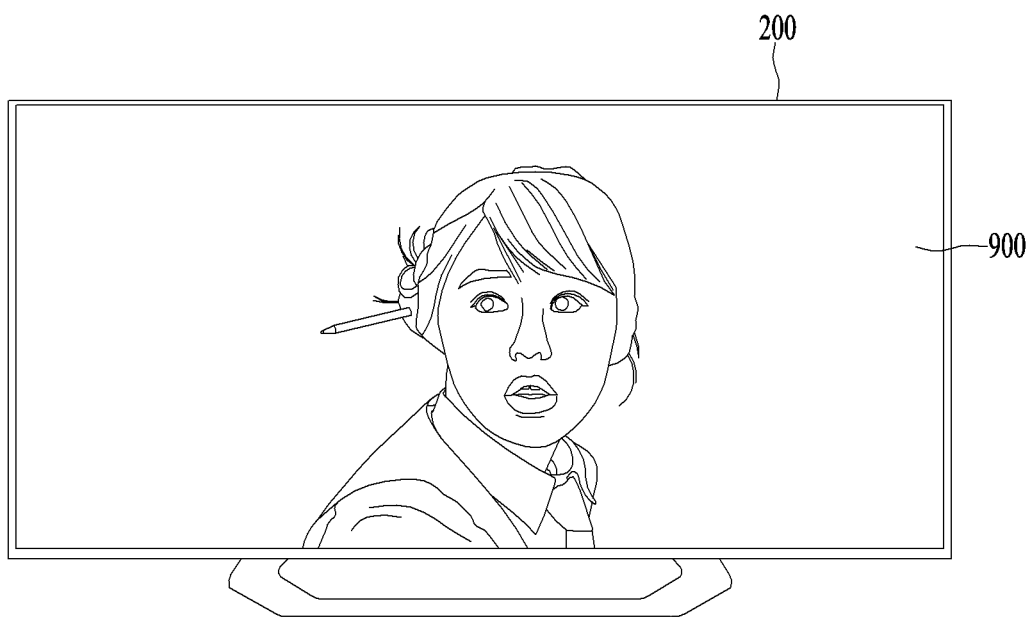

MULTIMEDIA DEVICE WITH STANDBY MODE AND PROVIDING NOTIFICATION INFORMATION

TECHNICAL FIELD

The present invention relates to a multimedia device.

BACKGROUND ART

A television (TV) has been implemented as a multimedia device with multiple functions such as a computer support function and an Internet function as well as a broadcast reception function. In recent years, a home network environment where signals can be exchanged between electronic products and information communication devices in a house has become common, and thus, the necessity of providing information customized for a user at home has been increased.

DISCLOSURE OF THE INVENTION

Technical Task

Accordingly, an object of the present invention is to address the above-noted and other problems. Another object of the present invention is to provide a multimedia device capable of providing information customized for each user when the multimedia device is in standby mode.

A further object of the present invention is to provide a multimedia device capable of providing information customized for each user when the multimedia device is in ON state.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve these objects and other advantages, in an aspect of the present invention, provided herein is a multimedia device, including: a controller configured to enter standby mode when the multimedia device is off; a notification information collection unit configured to collect notification information from at least one of a broadcasting station, an external device, and an external server when the multimedia device enters the standby mode; a sensing unit configured to obtain information of a user and distance information to the user when the multimedia device enters the standby mode; and a display unit. When the user recognized on the basis of the obtained user information corresponds to a predetermined user and when the obtained distance information to the user corresponds to a predetermined distance value, the controller may be configured to activate a partial area of the display unit and display notification information corresponding to the recognized user of the collected notification information in the activated partial area.

In another aspect of the present invention, provided herein is a multimedia device, including: a receiver configured to receive a broadcast signal; a display unit configured to display video data of a broadcast program included in the received broadcast signal; a sensing unit configured to sense information of a user; and a controller. In this case, the controller may be configured to: sense information of a user watching the broadcast program while displaying the video data of the broadcast program; store the sensed user information in a memory in response to the broadcast program; when video data of a broadcast program, which is the same as the broadcast program, is display on the display unit again after reception of the broadcast signal related to the broadcast program is completed, re-sense information of a user watching the broadcast program; and when the re-sensed user information is different from the user information stored in the memory, control a signal for providing a notification to be transmitted to a predetermined external device.

Advantageous Effects

According to the present invention, a multimedia device can provide the following effects and/or advantages.

According to at least one embodiment of the present invention, it is possible to provide a multimedia device capable of providing information customized for each user when the multimedia device is in standby mode.

In addition, according to at least one embodiment of the present invention, it is possible to a multimedia device capable of providing information customized for each user when the multimedia device is in ON state.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 9 is a diagram illustrating still another example of a method for providing notification information for each user at the multimedia device according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
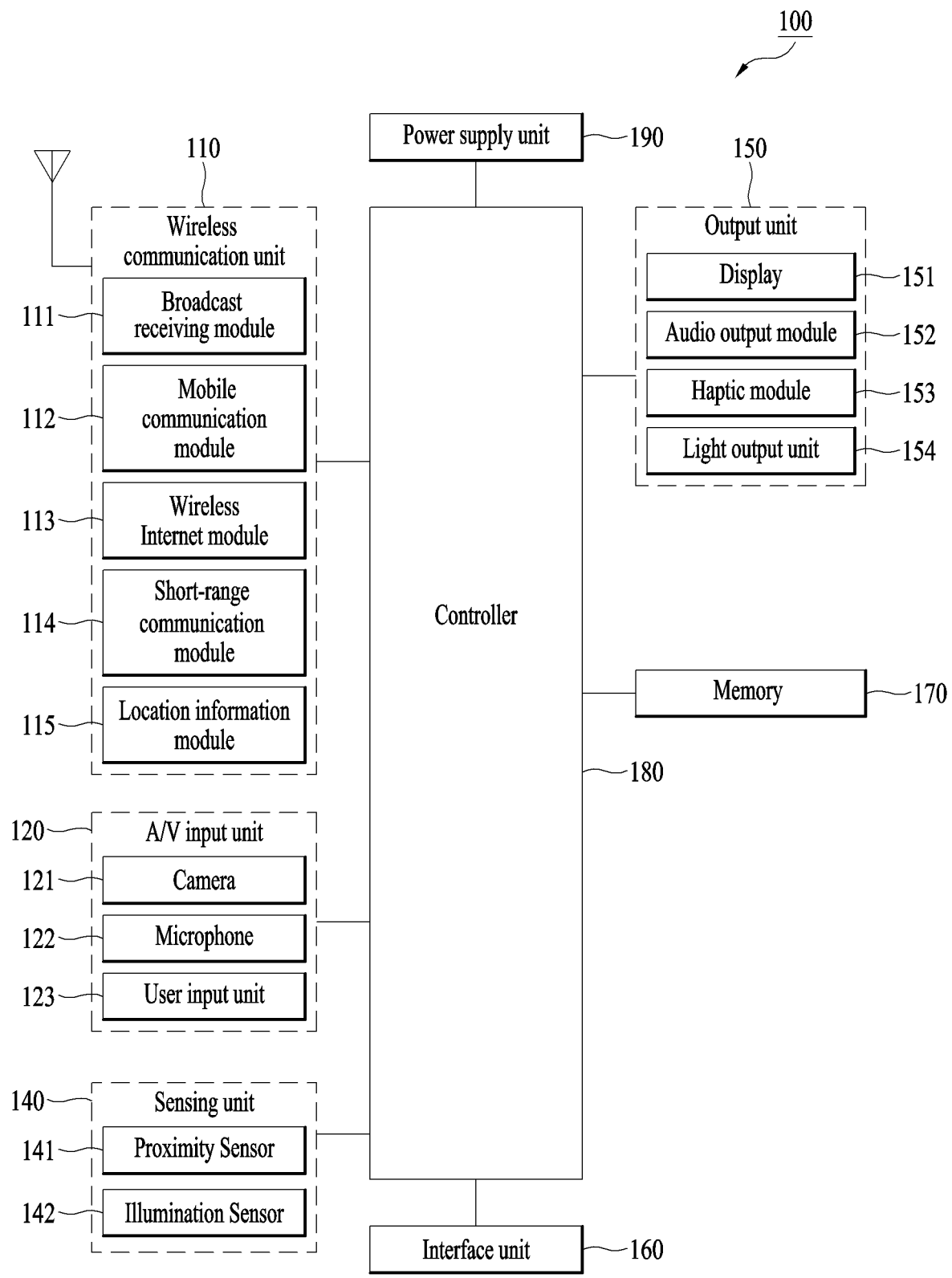
FIG. 1 is a block diagram illustrating a mobile terminal according to the present invention.

FIG. 1 is a block diagram of a mobile terminal in accordance with the present disclosure.

Referring now to FIG. 1, the mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

TO facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, and informations inputted or outputted through the components mentioned in the foregoing description, or runs an application program saved in the memory 170, thereby providing or processing an information or function appropriate for to a user.

The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DENA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, FISDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
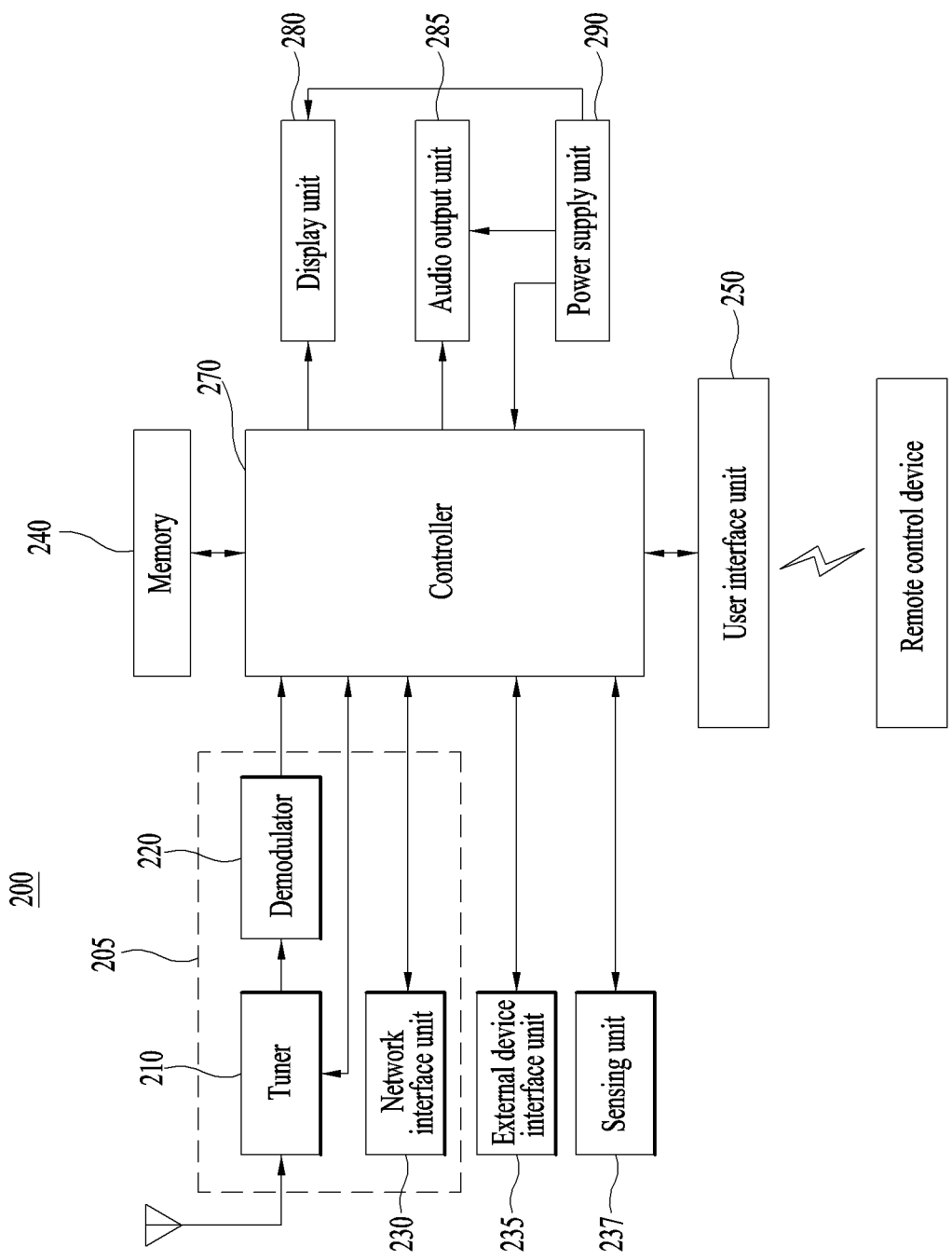
FIG. 2 is a block diagram illustrating a multimedia device according to one embodiment of the present invention.

FIG. 2 is a block diagram illustrating a multimedia device according to one embodiment of the present invention.

The multimedia device 200 according to one embodiment of the present invention corresponds to, for example, an intelligent network TV having a computer support function in addition to a broadcast reception function, that is, a device capable of supporting not only the broadcast reception function but also an Internet function. For example, the multimedia device 200 may be a network TV, smart TV, hybrid broadcast broadband television (HBBTV), Internet TV, web TV, Internet protocol television (IPTV), etc. Further, the multimedia device 200 may have an HDMI port supporting HDMI version 2.0.

The multimedia device 200 may include a receiver 205, an external device interface unit 235, a memory 240 (storage unit), a display unit 280, an audio output unit 286, a power supply unit 290, a controller 270, a user interface unit 250, a sensing unit 237, and the like. In some embodiments, the multimedia device 200 may further include a camera (not shown in the drawing).

The receiver 205 may include at least one tuner 210, a demodulator 220, and a network interface unit 230. However, in some cases, the receiver 205 may include the tuner 210 and the demodulator 220 but not include the network interface unit 230, and vice versa. In addition, although not shown in the drawing, the receiver 205 may include a multiplexer. In this case, the receiver 205 may multiplex a signal demodulated by the demodulator 220 after passing through the tuner 210 and a signal received through the network interface unit 230. Moreover, although not shown in the drawing, the receiver 205 may include a demultiplexer. In this case, the receiver 205 may demultiplex the multiplexed signal, demodulated signal, or signal passing through the network interface unit 230.

The tuner 210 receives a radio frequency (RF) broadcast signal by tuning to a channel selected by a user from among RF broadcast signals received through an antenna or all previously stored channels. In addition, the tuner 210 may convert the received RF broadcast signal into an intermediate frequency (IF) signal or a baseband signal.

For example, if the received RF broadcast signal is a digital broadcast signal, the tuner 210 converts the received RF broadcast signal to a digital IF (DIF) signal, and if the received RF broadcast signal is an analog broadcast signal, the tuner 210 converts the received RF broadcast signal into an analog baseband video or audio signal (CVBS/SIF). That is, the tuner 210 may process both the digital broadcast signal and the analog broadcast signal. The analog baseband video or audio signal (CVBS/SIF) output from the tuner 210 may directly be input to the controller 270.

Also, the tuner 210 may receive a single-carrier RF broadcast signal or a multiple-carrier RF broadcast signal. Meanwhile, the tuner 210 may sequentially tune to the RF broadcast signals of all the broadcast channels stored through a channel memory function from among the RF broadcast signals received through the antenna, and then convert the signals into IF signals or baseband signals (DIF: Digital Intermediate Frequency or baseband signals).

The demodulator 220 may receive the converted digital IF (DIF) signal from the tuner 210 and demodulate the received DIF signal, and then perform channel decoding. To this end, the demodulator 220 may include a trellis decoder, a de-interleaver, and a Reed-Solomon decoder or include a convolutional decoder, a de-interleaver, and a Reed-Solomon decoder.

The demodulator 220 may perform demodulation and channel decoding and then output a Transport Stream (TS) signal. The TS signal may be a signal in which a video signal, an audio signal and a data signal are multiplexed. For example, the TS signal may be an MPEG-2 TS in which an MPEG-2 video signal, a Dolby AC-3 audio signal and the like are multiplexed.

The TS signal output from the demodulator 220 may be input to the controller 270. The controller 270 may control demultiplexing, video/audio signal processing, and the like and then control output of a video through the display unit 280 and control output of an audio through the audio output unit 285.

The external device interface unit 235 provides an environment for interfacing the multimedia device 200 with various external devices. To this end, the external device interface unit 35 may include an A/V input/output unit (not shown) or a wireless communication unit (not shown).

The external device interface unit 235 may be connected with external devices such as a digital versatile disk (DVD), a Blu-ray player, a game device, a camera, a camcorder, a computer (notebook computer), a tablet PC, a smart phone, a Bluetooth device, a Cloud in a wired/wireless manner. The external device interface unit 235 transfers a signal including data such as image, video, and audio input through a connected external device to the controller 270 of the multimedia device 200. The controller 270 may control the data signal such as the processed image, video and audio to be output to the connected external device. To this end, the external device interface unit 235 may include an A/V input/output unit (not shown) or an RF communication unit (not shown).

The A/V input/output unit may include a universal serial bus (USB) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc., to input the video and audio signals of the external device to the multimedia device 200.

The wireless communication unit may perform wireless communication with other digital devices. For example, the multimedia device 200 may be networked with other digital devices in accordance with communication protocols such as Wireless LAN (WLAN), Wireless-Fidelity (Wi-Fi), Wi-Fi Direct, Bluetooth, radio frequency identification (RFID), infrared data association (IrDA), ultra wideband (UWB), ZigBee, and digital living network alliance (DLNA), etc. In some embodiments, the wireless communication unit may operate as a module capable of performing functions of at least one of the network interface unit 230, the external device interface unit 235, and the wireless communication unit.

Also, the external device interface unit 235 may be connected to a set-top box (STB) through at least one of the above-described various terminals so as to perform an input/output operation with the set-top box (STB).

Meanwhile, the external device interface unit 235 may receive an application or application list within its adjacent external device and then transfer the received application or application list to the controller 270 or the memory 240.

The network interface unit 230 provides an interface for connecting the multimedia device 200 to wired/wireless networks including the Internet network. The network interface unit 230 may include an Ethernet terminal, for example, for wire network connection. For wireless network connection, Wireless LAN (WLAN) (Wi-Fi), Wireless Broadband (WiBro), Worldwide Interoperability for Microwave Access (WiMAX), and High Speed Downlink Packet Access (HSDPA) communication specifications may be used.

The network interface unit 230 may transmit or receive data to or from other users or other digital devices through a connected network or other networks linked with the connected network. Particularly, the network interface unit 230 may transmit some of content data stored in the multimedia device 200 to other users previously registered in the multimedia device 200, or users or digital devices selected from among other digital devices.

Meanwhile, the network interface unit 230 may be connected to a predetermined web page through a connected network or other networks linked with the connected network. That is, the network interface unit 230 may be connected to a predetermined web page through a network to transmit or receive data to or from a corresponding server. In addition, the network interface unit 230 may receive content or data provided by a content provider or a network manager. That is, the network interface unit 230 may receive content such as movies, advertisements, games, VOD, or broadcast signals and information associated with the content, which are provided by the content provider or the network provider over a network. The network interface unit 230 may also receive update information and update files of firmware provided by the network manager. The network interface unit 230 may transmit data to the Internet or content provider or the network manager.

The network interface unit 230 may selectively receive a desired application from among publicly open applications through a network.

The memory 240 may store programs for signal processing and control in the controller 270 and store a signal-processed video, audio or data signal.

In addition, the memory 240 can execute a function of temporarily storing a video, audio or data signal input from the external device interface unit 235 or the network interface unit 230. The memory 240 may store information on a predetermined broadcast channel through the channel memory function.

The memory 240 may store an application or a list of applications input from the external device interface unit 235 or the network interface unit 230.

Also, the memory 240 may store various platforms which will be described later.

The memory 240 may include at least one of a flash memory type memory, a hard disk type memory, a multimedia card micro type memory, a card type memory (e.g., SD or XD memory), RAM, EEPROM, etc. The multimedia device 200 may reproduce content files (e.g., a video file, a still image file, a music file, a text file, an application file, etc.) stored in the memory 240 and provide them to the user. In some embodiments, the memory 240 may be included in the controller 270.

The user input interface unit 250 may transmit a signal input by the user to the controller 270 or deliver a signal output from the controller 270 to the user.

For example, the user input interface unit 250 may receive control signals such as a power on/off signal, a channel selection signal, an image setting signal, etc. from a remote control device or transmit control signals of the controller 270 to the remote control device in accordance with various communication schemes such as RF communication, IR communication, and the like.

In some embodiments, the remote control device may be a remote controller or the mobile terminal 100 described above with reference to FIG. 1.

The user input interface unit 250 may transmit control signals input through a power key, a channel key, a volume key, and a local key (not shown) of a set value to the controller 270.

The user input interface unit 250 may transmit a control signal input from a sensing unit (not shown) which senses a gesture of the user or forward a signal from the controller 270 to the sensing unit (not shown). In this case, the sensing unit (not shown) may include a touch sensor, a voice sensor, a position sensor, an action sensor, etc.

The controller 270 may generate and output a signal for video or audio output by demultiplexing streams input through the tuner 210, the demodulator 220 or the external device interface unit 235 or processing demultiplexed signals.

A video signal processed by the controller 270 may be input to the display unit 280 and displayed as an image corresponding to the corresponding video signal on the display unit 280. In addition, the video signal processed by the controller 270 may be input to an external output device through the external device interface unit 235.

The controller 270 may include a demultiplexer, an image processing unit, and the like.

The controller 270 may control the overall operation of the multimedia device 200. For example, the controller 270 may control the tuner 210 to tune to an RF broadcast corresponding to a channel selected by the user or a previously stored channel.

The controller 270 may control the multimedia device 200 in accordance with a user command input through the user input interface unit 250 or an internal program. Particularly, the controller 270 may control the multimedia device 200 to download an application or application list that the user desires by connecting it to a network.

For example, the controller 270 controls the tuner 210 to receive a signal of a channel selected in response to a predetermined channel selection command received through the user input interface unit 250. In addition, the controller 270 processes a video, audio or data signal corresponding to the selected channel. The controller 270 may control information on a channel selected by the user to be output with a processed video or audio signal through the display unit 280 or the audio output unit 285.

As another example, the controller 270 controls a video signal or an audio signal received from an external device, for example, a camera or a camcorder through the external device interface unit 235 to be output through the display unit 280 or the audio output unit 285 in accordance with an external device image reproduction command received through the user input interface unit 250.

Meanwhile, the controller 270 may control the display unit 280 to display images. For example, the controller 270 may control a broadcast image input through the tuner 210, an external input image received through the external device interface unit 235, an image input through the network interface unit 230, or an image stored in the memory 240 to be displayed on the display unit 280. In this case, an image displayed on the display unit 280 may be a still image or video, and it may be a 2D or 3D image.

In addition, the controller 270 may control reproduction of content. In this time, the content may be content stored in the multimedia device 200, received broadcast content, or content input from an external device. The content may include at least one of a broadcast image, an external input image, an audio file, a still image, an image of a linked web, and a text file.

Meanwhile, when an application view menu is selected, the controller 270 may control applications or a list of applications, which are downloadable from the multimedia device 200 or an external network, to be displayed.

The controller 270 may control installation and execution of applications downloaded from the external network in addition to various user interfaces. Furthermore, the controller 270 may control an image related to an application executed by user's selection to be displayed on the display unit 280.

The display unit 280 may convert a video signal, a data signal, and an OSD signal processed by the controller 270 or a video signal and a data signal received from the external device interface unit 235 into RGB signals to generate driving signals.

The display unit 280 may be a PDP, an LCD, an OLED, a flexible display, a 3D display or the like.

The display unit 280 may be implemented as a touchscreen and used as an input device rather than an output device.

The audio output unit 285 receives a signal audio-processed by the controller 270, for example, a stereo signal, a 3.1 channel signal or a 5.1 channel signal, and outputs the received signal as audio data. The audio output unit 285 may be implemented as various speakers.

As described above, the multimedia device 200 may further include the sensing unit (not shown) for sensing a gesture of the user, which includes at least one of a touch sensor, a voice sensor, a position sensor, and an action sensor. A signal sensed by the sensing unit (not shown) may be delivered to the controller 270 through the user input interface unit 250.

Meanwhile, the multimedia device 200 may further include a photographing unit (not shown) for photographing the user. Information on an image captured by the photographing unit (not shown) may be delivered to the controller 270

The controller 270 may sense a gesture of the user from the image captured by the photographing unit (not shown) or the signal sensed by the sensing unit (not shown), or by combining the image and signal.

The power supply unit 290 supplies a corresponding power to the multimedia device 200.

Particularly, the power supply unit 290 may supply power to the controller 270 which may be implemented as a system-on-chip (SoC), the display unit 280 for displaying images, and the audio output unit 285 for audio output.

To this end, the power supply unit 290 may include a converter (not shown) for converting alternating current power to direct current power. Meanwhile, if the display unit 280 is implemented as a liquid crystal panel that includes a plurality of backlight lamps, the power supply unit 290 may further include an inverter (not shown) that enables pulse width modulation (PWM) operation for luminance variance or dimming driving.

The remote control device delivers a user input to the user input interface unit 250. To this end, the remote control device may use Bluetooth, RF communication, IR communication, UWB, ZigBee, etc.

In addition, the remote control device may receive an audio, video or data signal output from the user input interface 250 and display the received signal or output the same as audio or vibration.

The camera processes picture frames of a still image or video image obtained by an image sensor in capturing mode. The processed picture frames may be displayed on the display unit 280 or stored in the memory 240.

The sensing unit 237 may sense at least one of information within the multimedia device 200, information on the surrounding environment of the multimedia device 200, and user information. The sensing unit 237 may include at least one of a proximity sensor, an illumination sensor, a camera, and an environment sensor (e.g., a barometer, a hygrometer, a thermometer, a radiation sensor, a heat sensor, a gas sensor, etc.). In some embodiments, the sensing unit 237 may perform the functions of at least one of the network interface unit 230 and the external device interface unit 235.

The multimedia device 200 may be an ATSC or DVB digital broadcast receiver, which is fixed or movable, capable of processing a digital broadcast signal.

In addition, in the multimedia device according to the present invention, some of the shown components may be omitted or a component (not shown) may be added if necessary. Meanwhile, the multimedia device may not include the tuner and the demodulator, different from the above description and may receive content through the network interface unit or the external device interface unit to reproduce the content.

Figure 3:
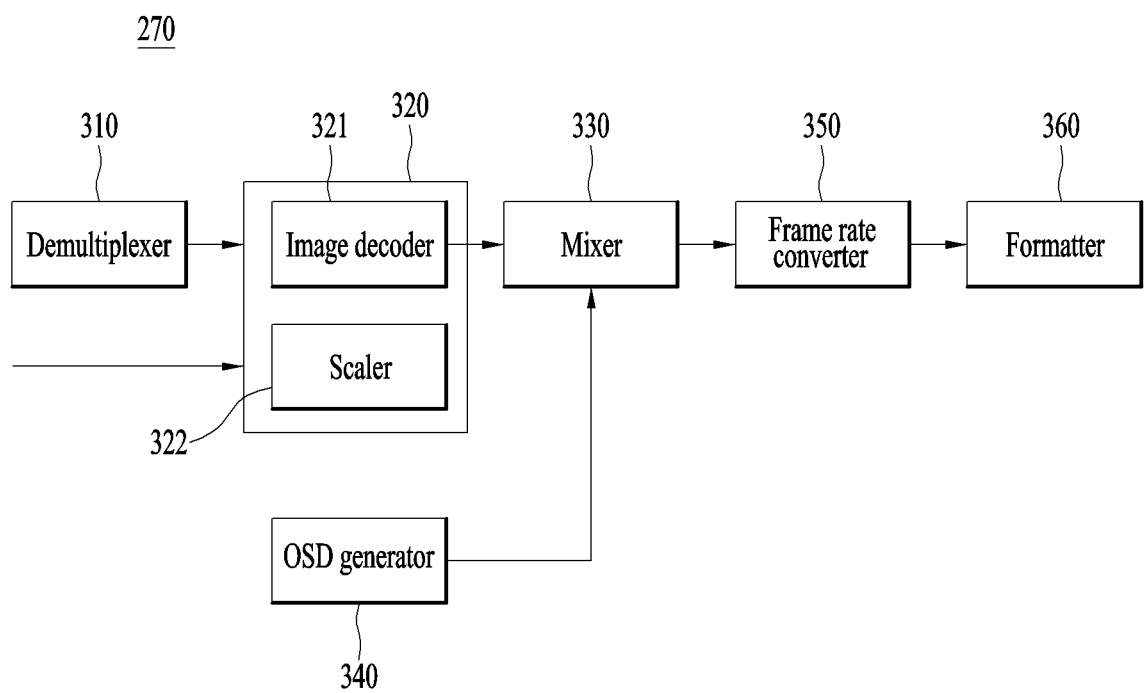
FIG. 3 is a block diagram illustrating in detail the configuration of a controller of FIG. 2 according to one embodiment of the present invention.

FIG. 3 is a block diagram illustrating in detail the configuration of the controller of FIG. 2 according to one embodiment of the present invention.

The controller 270 of the multimedia device 200 according to one embodiment of the present invention may include a demultiplexer 310, an image processing unit 320, an OSD generator 340, a mixer 330, a frame rate converter (FRC) 350, and a formatter 360. Although not shown in the drawing, the controller 270 may include an audio processing unit and a data processing unit.

The demultiplexer 310 demultiplexer an input stream. For example, the demultiplexer 310 may demultiplex an input stream into an MPEG-2 TS image, an audio signal and a data signal. In this case, the stream signal input to the demultiplexer 310 may be a stream signal output from the tuner, the demodulator or the external device interface unit.

The image processing unit 320 may perform image processing on a demultiplexed image signal. To this end, the image processing unit 320 may include an image decoder 321 and a scaler 322.

The image decoder 321 may decode the demultiplexed image signal and the scaler 322 may scale the resolution of the decoded image signal such that the image signal can be displayed on the display unit.

The image decoder 321 may support various specifications. For example, the image decoder 321 may perform the function of an MPEG-2 decoder if the image signal is encoded by the MPEG-2 specification, and may perform the function of an H.264 decoder if the image signal is encoded by DMB (Digital Multimedia Broadcasting) mode or H.264 specification.

Meanwhile, the image signal decoded by the image processing unit 320 is input to the mixer 330.

The OSD generator 340 generates OSD data automatically or according to a user input. For example, the OSD generator 340 generates data necessary for displaying as a graphic or text various data on the screen of the display unit 280 based on a control signal from the user input interface unit 250. The generated OSD data may include various data such as a user interface screen of the digital device (e.g., GUI), various menu screens, widgets, icons, and viewing rate information. The OSD generator 340 may generate data for displaying a broadcast caption or EPG based broadcast information.

The mixer 330 mixes the OSD data generated by the OSD generator 340 with the image signal processed by the image processing unit 320 and then provides the mixed signal to the formatter 360. By mixing the decoded image signal with the OSD data, OSD may be overlaid on a broadcast image or external input image.

The frame rate converter (FRC) 350 converts a frame rate of the input image. For example, the frame rate converter 350 may convert the frame rate of the input image from 60 Hz to, for example, 120 or 240 Hz in accordance with an output frequency of the display unit. There may be various methods for converting the frame rate. For example, when the frame rate is converted from 60 Hz to 120 Hz, the frame rate converter 350 may insert a first frame between the first frame and a second frame or insert a third frame, which is predicted from the first and second frames, between the first and second frames. For another example, When the frame rate is converted from 60 Hz to 240 Hz, the frame rate converter 350 may insert three same frames or three predicted frames between the existing frames. Meanwhile, the frame rate converter 350 may be bypassed when separate frame conversion is not executed.

The formatter 360 changes the output of the frame rate converter 350, which is input thereto, into a form suitable for the output format of the display unit. For example, the formatter 360 may output an RGB data signal. In this case, the RGB data signal may be output as a low voltage differential signal (LVDS) or mini-LVDS. When the output of the frame rate converter 350, which is input to the formatter 360, is a 3D image signal, the formatter 360 may format the 3D image signal such that the 3D image signal is matched with the output format of the display unit, to thereby support a 3D service through the display unit.

Meanwhile, the audio processing unit (not shown) in the controller 270 may perform audio processing on a demultiplexed audio signal. The audio processing unit (not shown) may support various audio formats. For example, when audio signals are encoded in MPEG-2, MPEG-4, AAC, HE-AAC, AC-3 and BSAC formats, the audio processing unit (not shown) may include decoders corresponding to the formats to process the audio signals.

Further, the audio processing unit (not shown) in the controller may control base, treble and volume.

The data processing unit (not shown) in the controller may perform data processing on a demultiplexed data signal. For example, when a demultiplexed data signal is encoded, the data processing unit may decode the encoded demultiplexed data signal. In this case, the encoded data signal may be EPG information including broadcast information such as the start time and end time of a broadcast program which is broadcast through each channel.

The aforementioned multimedia device 200 according to the present invention is exemplary, and components thereof may be integrated, added or omitted depending on its implementation. That is, if necessary, two or more components may be integrated into one component or one component may be subdivided into two or more components. The function executed by each block is to explain the embodiments of the present invention, and detailed operations or devices do not limit the scope of the present invention.

Hereinafter, methods for providing notification information for each user at the multimedia device 200 and methods for providing notification information through the multimedia device 200 at the user's mobile terminal 100 will be described with reference to FIGS. 4 to 17.

Figure 4:
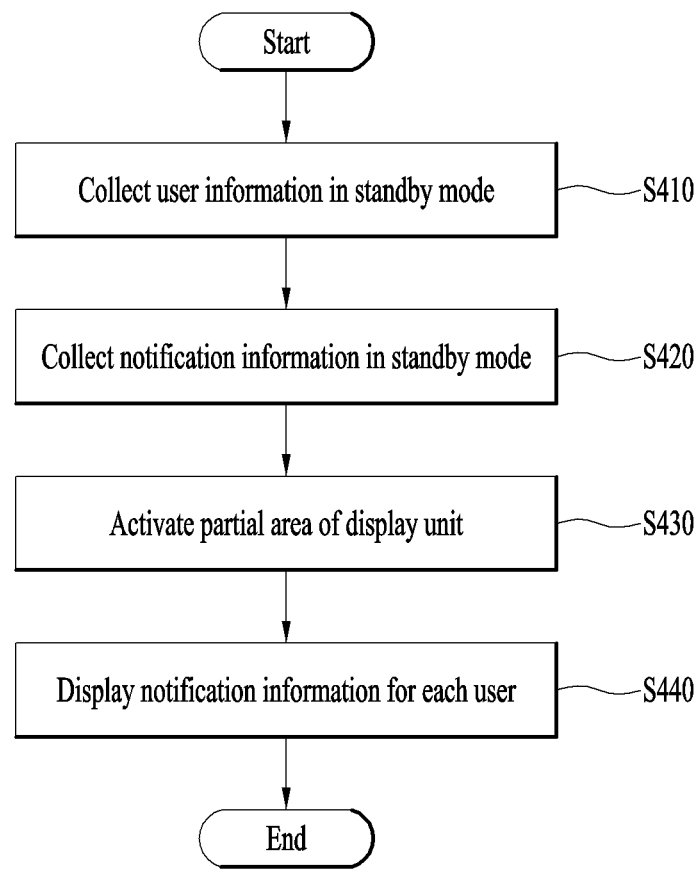
FIG. 4 is a flowchart illustrating an example of a method for providing notification information for each user at the multimedia device according to one embodiment of the present invention.

FIG. 4 is a flowchart illustrating an example of a method for providing notification information for each user at the multimedia device according to one embodiment of the present invention.

When the multimedia device 200 is off, the controller 270 of the multimedia device 200 can enter standby mode and then collect user information in the standby mode [S410]. The OFF state of the multimedia device 200 means that the multimedia device 200 is turned off according to a user's power off command, but it does not mean that power is not supplied to the multimedia device 200. The standby mode of the multimedia device 200 means a state in which standby power for maintaining predetermined minimal functions is supplied to the multimedia device 200. In the present embodiment, the predetermined minimal function may mean a function of a configuration module required for the multimedia device 200 to provide predetermined notification information to a user.

When the multimedia device 200 enters the standby mode, the controller 270 of the multimedia device 200 may control the sensing unit 237 to obtain information of a user and information on a distance to the user. That is, when the multimedia device 200 enters the standby mode, some components in the sensing unit 237 may be activated to obtain the information of the user and the distance information to the user.

For example, the sensing unit 237 may obtain the information of the user by detecting a predetermined user's face from an image obtained by the camera included in the sensing, unit 237 or detecting an external device corresponding to a predetermined user using the wireless communication unit included in the sensing unit 237.

In addition, for example, the sensing unit 237 may obtain the distance information to the user by detecting a predetermined user's size from the image obtained by the camera included in the sensing unit 237 or detecting strength, delay time, or the like of a signal received from the external device corresponding to the predetermined user using the wireless communication unit included in the sensing unit 237. Alternatively, the sensing unit 237 may obtain the distance information to the user using the proximity sensor included in the sensing unit 237.

In some embodiments, the sensing unit 237 may obtain the information of the user and the distance information to the user based on a signal received from a gateway device (not shown) in the house. As a device for connecting electronic devices in the house to an external communication network, the gateway device may work as a home environment controller for controlling the electronic devices. For example, the signal received from the gateway device may include information of the user and distance information to the user obtained by a camera of the gateway device, information of the user and distance information to the user obtained by a wireless communication unit of the gateway device, and the like.

Moreover, the controller 270 of the multimedia device 200 may recognize the user corresponding to the obtained user information based on the user information, which is obtained through the sensing unit 237, in the standby mode.

The memory 240 of the multimedia device 200 may store data required for identifying the corresponding user based on the user information obtained by the sensing unit 237 in advance.

Meanwhile, the controller 270 of the multimedia device 200 may collect notification information from at least one of a broadcasting station, an external device, and an external server [S420]. For example, the controller 270 of the multimedia device 200 may collect the notification information from the at least one of the broadcasting station, external device, and external server through at least one of the tuner 210, network interface unit 230, external interface unit 235, sensing unit 237, and wireless communication unit. In some embodiments, the collection of the notification information may be performed before the multimedia device 200 enters the standby mode. In some embodiments, when the mobile terminal 100 is wirelessly connected to the multimedia device 200, the multimedia device 200 may receive notification information from the mobile terminal 100. For example, when the user of the mobile terminal 100 enters the home after going out, if there is history information indicating that the mobile terminal 100 and the multimedia device 200 were wirelessly connected to each other, the mobile terminal 100 may be automatically paired with the multimedia device 200, and then the multimedia device 200 may receive the notification information from the mobile terminal 100.

For example, the notification information may include program information included in a broadcasting signal that can be received through the tuner 210 or the network interface unit 230, a missed call received at a predetermined external mobile terminal 100, an unchecked text message, schedule information, information on a missed call at the phone in the house, information on a visitor obtained by the camera of the multimedia device 200 or the camera of the gateway device, information on a message received by the predetermined external mobile terminal 100, information on weather, traffic, and the like transmitted from an external server, and information on an environment (e.g., humidity, temperature, dust concentration, etc.) transmitted from an electronic device in the house. The controller 270 of the multimedia device 200 may sort the collected information for each previously registered user and then the sorted collected information in the memory 240.

The memory 240 of the multimedia device 200 may have stored data required for recognizing a user's face, history information of broadcast programs, which has been watched by the user though the multimedia device 200, and information on the mobile terminal 100 corresponding to the user.

If the user recognized on the basis of the obtained user information is a predetermined user, and if the obtained distance information to the user corresponds to a predetermined distance, the controller 270 of the multimedia device 200 activates a partial area of the display unit 280 [S430].

Thereafter, the controller 270 of the multimedia device 200 displays notification information corresponding to the recognized user of the collected notification information in the partial area of the display unit 280 [S440].

According to the present embodiment, when a user approaches the multimedia device 200 while the multimedia device 200 is off, the multimedia device 200 can display notification information corresponding to the user by activating a partial area of the display unit 280. Hence, the multimedia device 200 has advantages in that power of the multimedia device 200 can be used efficiently and information customized for each user can be provided.

In some embodiments, at least part of the displayed notification information may be changed according to the obtained distance information to the user. For example, if a value of the obtained distance information to the user is increased within a predetermined range, the amount (volume) of the displayed notification information may be decreased. On the contrary, if the value of the obtained distance information to the user is decreased within the predetermined range, the amount (volume) of the displayed notification information may be increased.

In addition, in some embodiments, the displayed notification information may further include a menu option for checking detailed information, controlling an external device associated with the notification information, or checking the notification information through a predetermined external device. When receiving a command for selecting the menu option, the controller 270 of the multimedia device 200 may activate a multimedia device 200's function of checking the detailed information, transmit a signal required for controlling the external device associated with the notification information to the predetermined external device, or transmit a signal required for checking the notification information through the external device to the predetermined external device.

Figure 5:
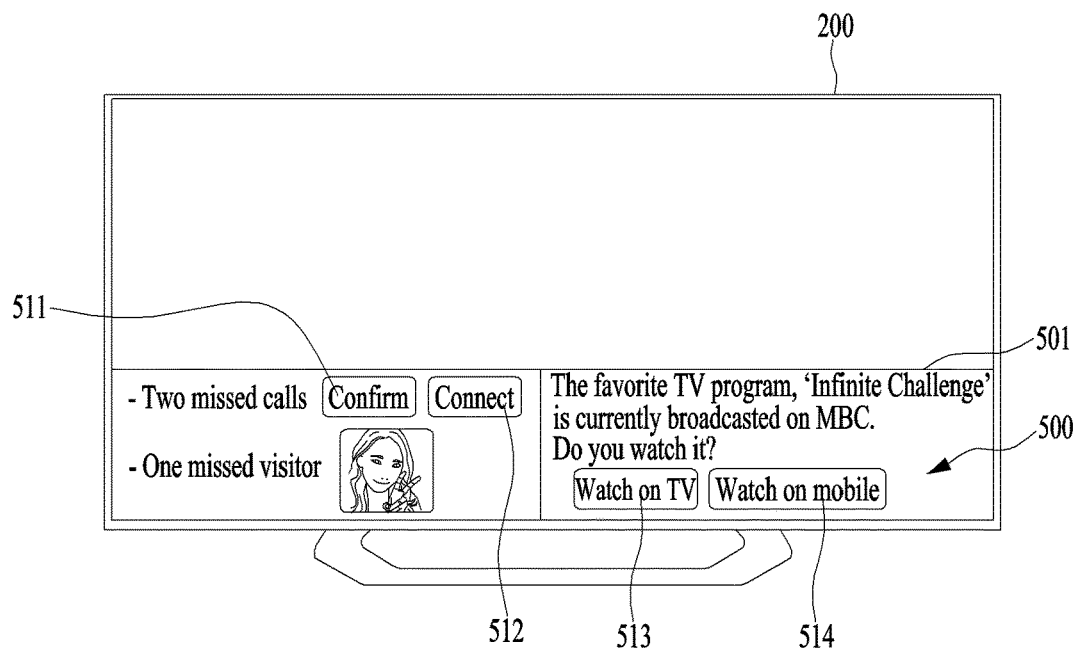
FIG. 5 is a diagram illustrating an example of a method for providing notification information for each user at the multimedia device according to one embodiment of the present invention.

FIG. 5 is a diagram illustrating an example of a method for providing notification information for each user at the multimedia device according to one embodiment of the present invention. To avoid redundant description, the features described above with reference to FIG. 4 will not be described again.

When the multimedia device 200 is off, the controller 270 of the multimedia device 200 enters the standby mode. In addition, when the user recognized on the basis of the user information obtained by the sensing unit 273 corresponds to a first predetermined user, and when the distance information to the user obtained by the sensing unit 273 corresponds to a predetermined distance value, the controller 270 may activate a partial area 501 of the display unit 280 and then display notification information 500 corresponding to the first user of collected notification information in the partial area 501. In this case, the predetermined distance value may be a value when a distance between the first user and the multimedia device 200 is smaller than a predetermined distance.

For example, the notification information 500 displayed in the partial area 501 may include information on a missed call at the mobile terminal 100 corresponding to the first user, information on a missed call at the phone in the house, information on a favorite broadcast program of the first user among currently broadcasting broadcast programs on the basis of information on the first user's watching history stored in the memory 240, and the like.

In some embodiments, the controller 270 of the multimedia device 200 may receive, from the mobile terminal 100, information corresponding to a notification bar area, which is located at the top of the mobile terminal 100, and then display the information corresponding to the notification bar area in the partial area 501. For example, the configuration of the information displayed in the partial area 501 may be similar to that of the notification bar area.

In some embodiments, the notification information 500 may be implemented such that at least part of the notification information 500 can be selected. Specifically, the notification information 500 displayed in the partial area 501 may include at least one of a menu option 511 for checking detailed information of the notification information, a menu option 512 for controlling an external device associated with the notification information (e.g., the first user's mobile terminal 100), a menu option 513 for controlling a multimedia device 200's function corresponding to the notification information, and a menu option 514 for controlling the external device associated with the notification information (e.g., the first user's mobile terminal 100).

The first user may select any one among the menu options 511 to 514 using a remote controller or the mobile terminal 100 with a remote function for controlling the multimedia device 200.

For example, when receiving a command for selecting the menu option 511, the controller 270 of the multimedia device 200 may display detailed information such as the number, caller, and time of the missed call in the partial area 501 on the basis of the information on the missed call received at the mobile terminal 100 corresponding to the first user.

For another example, when receiving a command for selecting the menu option 512, the controller 270 of the multimedia device 200 may control a first signal for transmitting a call signal to be transmitted to the first user's mobile terminal 100 to call back to the number of the missed call. The first signal may be transmitted through the wireless communication unit to the first mobile terminal 100. The controller 180 of the mobile terminal 100 may control the mobile communication module 112 to call back to the number of the missed call. In some embodiments, when there are two or more missed calls, the first signal may be related to the number of the most recent missed call or the number of the calls missed more than a predetermined number of times.

As a further example, when receiving a command for selecting the menu option 513, the controller 270 of the multimedia device 200 may switch power mode of the multimedia device 200 from the standby mode to normal mode. In this case, the normal mode may mean mode for driving the multimedia device 200 when the multimedia device 200 is turned on by the user. In addition, the controller 270 of the multimedia device 200 may control the tuner 210 to tune to a channel where the broadcast program included in the notification information 500 is broadcasted and then display video data corresponding to the broadcast program included in a broadcast signal received through the tuner 210 on the display unit 280.

As a still further example, when receiving a command for selecting the menu option 514, the controller 270 of the multimedia device 200 may control a second signal for enabling the first user to watch the broadcast program included in the notification information 500 through the mobile terminal 100. Based on the second signal, the controller 180 of the mobile terminal 100 may activate a DMB application, receive video data corresponding to the broadcast program through the DMB application, and then display the received video data on the display unit 151.

In some embodiments, while displaying the notification information 500 in the partial area 501, the controller 270 of the multimedia device 200 may re-obtain the distance information to the first user through the sensing unit 237. If the re-obtained distance information to the first user is greater than the predetermined distance value, the controller 270 of the multimedia device 200 may stop display of the notification information 500 and deactivate the partial area 501.

Meanwhile, according to an embodiment of the present invention, when notification information 500 customized for a specific user is displayed on the display unit 280 while the multimedia device 200 is in the standby mode, a remote controller UI for controlling a multimedia device 200's function related to the notification information 500 can be automatically displayed on a predetermined mobile terminal 100. Details will be described with reference to FIG. 6.

Figure 6:
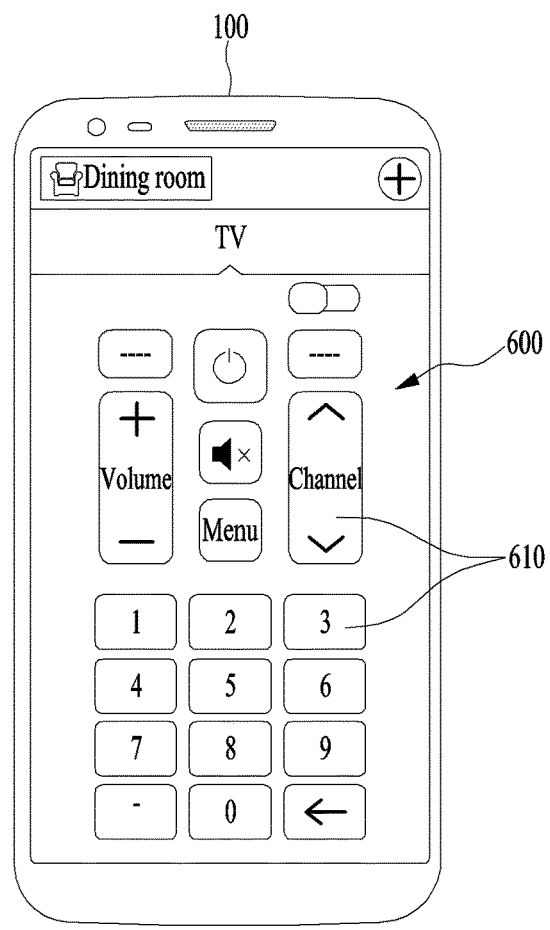
FIG. 6 is a diagram illustrating an example in which a mobile terminal displays a remote controller UI for controlling notification information displayed on the multimedia device according to one embodiment of the present invention.

FIG. 6 is a diagram illustrating an example in which a mobile terminal displays a remote controller UI for controlling notification information displayed on the multimedia device according to one embodiment of the present invention. To avoid redundant description, the features described above with reference to FIGS. 4 and 5 will not be described again.

When the notification information 500 is displayed in the activated partial area 501 of the display unit 280, the controller 270 of the multimedia device 200 may control the wireless communication unit to transmit a first signal corresponding to the notification information 500 to the mobile terminal 100 of the first user. In this case, the first signal may include information on a remote controller UI, which is related to a function for controlling the information of the multimedia device 200 and the notification information 500.

Based on the first signal, the controller 180 of the mobile terminal 100 may execute a remote controller application and display the remote controller UI 600 related to the function for controlling the notification information 500 on the display unit 151. The remote controller UI 600 may be to control functions of the multimedia device 200 or functions related to the notification information 500 among the functions of the multimedia device 200. The remote controller UI 600 may include a virtual menu button 610 corresponding to each function of the multimedia device 200, and a code value of a control signal corresponding to each function may be mapped to the menu button 610.

The first user may select at least part of the notification information 500 using the remote controller UI 600 displayed on the display unit 151 of the mobile terminal 100. For example, the first user may select any one among the menu options 511 to 514 of the notification information 500 using the remote controller UI 600 displayed on the display unit 151 of the mobile terminal 100.

The controller 180 of the mobile terminal 100 may transmit a code value of a control signal corresponding to the function, which is selected using the remote controller UI 600, through the wireless communication unit 110 to the multimedia device 200. Thereafter, the controller 270 of the multimedia device 200 may execute a corresponding function based on the received code value. Since functions executed by the multimedia device 200 are the same as those described with reference to FIG. 5, details will be omitted herein.

Figure 7:
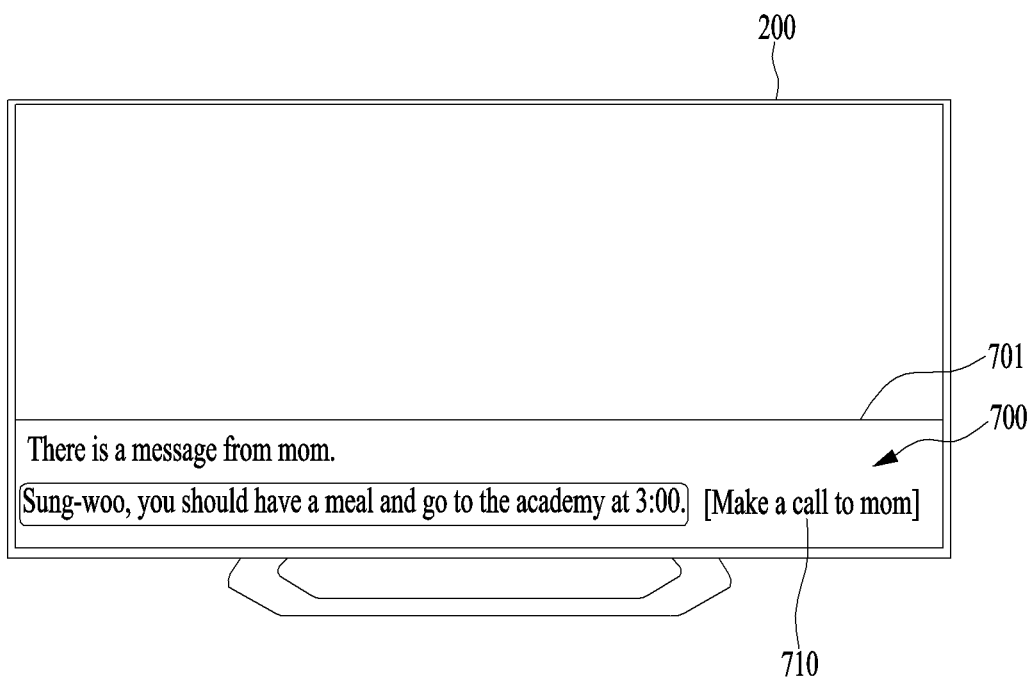
FIG. 7 is a diagram illustrating another example of a method for providing notification information for each user at the multimedia device according to one embodiment of the present invention.

FIG. 7 is a diagram illustrating another example of a method for providing notification information for each user at the multimedia device according to one embodiment of the present invention. To avoid redundant description, the features described above with reference to FIGS. 4 to 6 will not be described again.

When the multimedia device 200 is off, the controller 270 of the multimedia device 200 enters the standby mode. When the user recognized on the basis of the user information obtained by the sensing unit 273 corresponds to a second predetermined user, and when the distance information to the user obtained by the sensing unit 273 corresponds to a predetermined distance value, the controller 270 may activate a partial area 701 of the display unit 280 and then display notification information 700 corresponding to the second user of the collected notification information in the partial area 701.

For example, the notification information 700 displayed in the partial area 701 may include information on a message received from a first mobile terminal 100A of the first user, which is a guardian of the second user. Using the multimedia device 200 or the first mobile terminal 100A, the first user may set the multimedia device 200 to display a predetermined message when the second user is recognized in the state in which the multimedia device 200 is in the standby mode.

In some embodiments, the notification information 700 may further include a menu option 710 for connecting a call to the first mobile terminal 100A of the first user, which has sent the message included in the notification information 700.

When receiving a command for selecting the menu option 710, the controller 270 of the multimedia device 200 may control the wireless communication unit to transmit information of the first mobile terminal 100A of the first user to a second mobile terminal 100B of the second user. A controller 180 of the second mobile terminal 100B may control a mobile communication module 112 to send a call signal to the first mobile terminal 100A based on the received information of the first mobile terminal 100A.

That is, according to an embodiment of the present invention, the multimedia device 200 has an advantage of providing information customized for each recognized user in the standby mode.

Meanwhile, according to an embodiment of the present invention, when a distance from the multimedia device 200 to a predetermined user is smaller than a predetermined value, if it is determined that eyes of the predetermined user do not gaze the multimedia device 200, the multimedia device 200 may not provide notification information. In addition, when the distance from the multimedia device 200 to the predetermined user is greater than the predetermined value, if it is determined that the eyes of the predetermined user gaze the multimedia device 200, the multimedia device may provide notification information. Details will be described with reference to FIG. 8.

Figure 8:
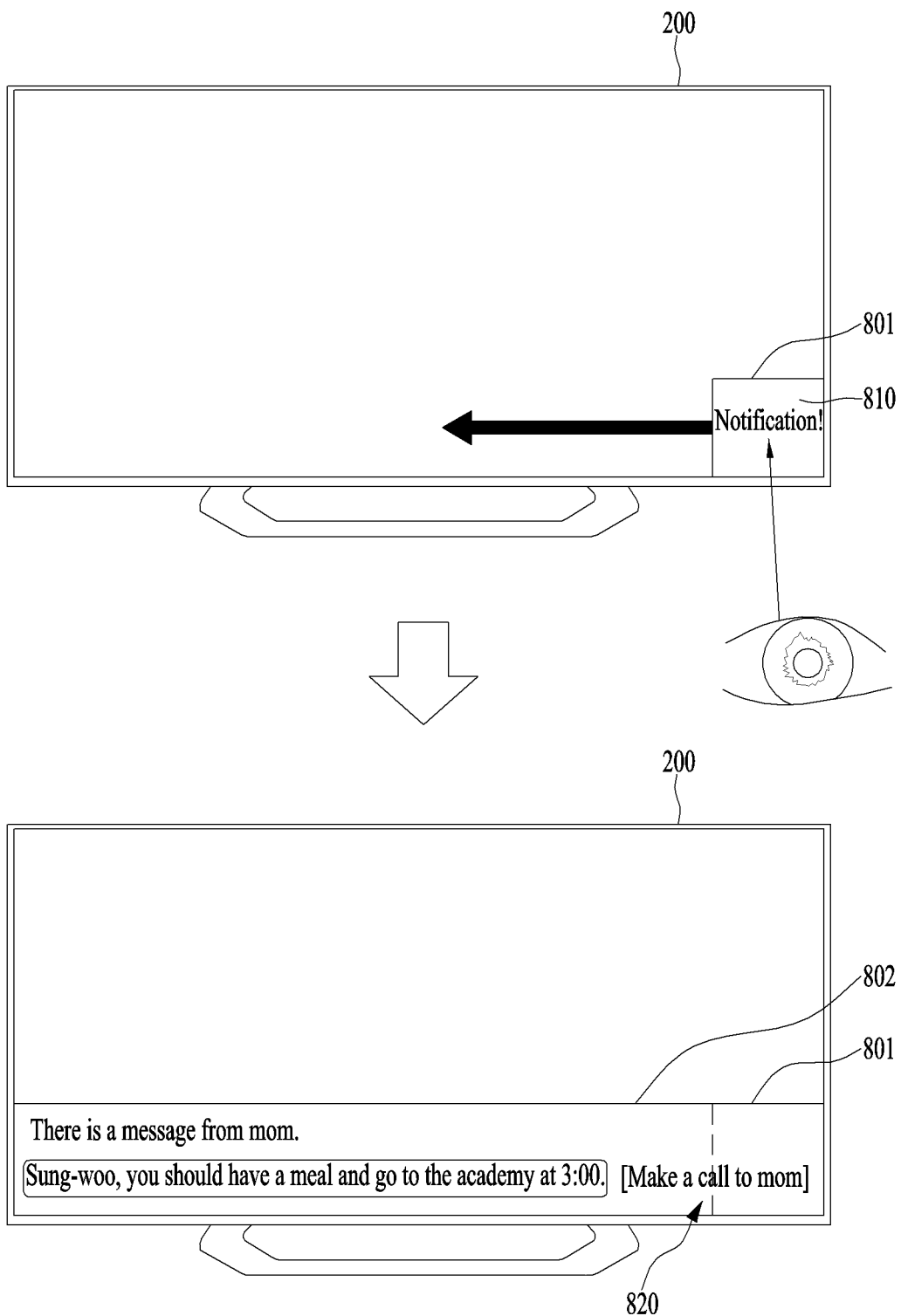
FIG. 8 is a diagram illustrating a further example of a method for providing notification information for each user at the multimedia device according to one embodiment of the present invention.

FIG. 8 is a diagram illustrating a further example of a method for providing notification information for each user at the multimedia device according to one embodiment of the present invention. To avoid redundant description, the features described above with reference to FIGS. 4 to 7 will not be described again.

Referring to FIG. 8, when the multimedia device 200 is off, the controller 270 of the multimedia device 200 enters the standby mode. When the user recognized on the basis of the user information obtained by the sensing unit 273 corresponds to the second predetermined user, and when the distance information to the user obtained by the sensing unit 273 corresponds to the predetermined distance value, the controller 270 may activate a partial area 801 of the display unit 280 and then display first information 810 indicating that there is notification information corresponding to the second user in the first area 801.

Next, the controller 270 of the multimedia device 200 may activate the camera (in some embodiments, the camera has already been activated) and then detect whether eyes of the second user gaze the first area 801, based on an image obtained by the camera. When it is detected that the eyes of the second user gaze the first area 801, the controller 270 of the multimedia device 200 may activate a second area 802 adjacent to the first area 801 and then display notification information 820 corresponding to the second user in the activated first and second areas 801 and 802.

In some embodiments, it is possible to apply a visual effect that the notification information 820 is displayed extensively from the first area 801 to the second area 802.

Since details of the notification information 820 are the same as those of the notification information 700 described above with reference to FIG. 7, it will not be described again.

Meanwhile, when it is detected that the eyes of the second user do not gaze the first area 801, the controller 270 of the multimedia device 200 may deactivate the first area 801 after elapse of a predetermined time.

In some embodiments, when it is detected that the eyes of the second user do not gaze the first area 801, the controller 270 of the multimedia device 200 may attract attention from the second user by outputting predetermined audio data through the audio output unit 285.

Meanwhile, according to an embodiment of the present invention, even when the multimedia device 200 operates in the normal mode, the multimedia device 200 can provide notification information for each user. Details will be described with reference to FIG. 9.

FIG. 9 is a diagram illustrating still another example of a method for providing notification information for each user at the multimedia device according to one embodiment of the present invention. To avoid redundant description, the features described above with reference to FIGS. 4 to 8 will not be described again.

In the present embodiment, it is assumed that the multimedia device 200 is in the normal mode rather than the standby mode and video data 900 corresponding to prescribed content is displayed on the display unit 280.

When the user recognized on the basis of the user information obtained by the sensing unit 273 corresponds to the first predetermined user, and when the distance information to the user obtained by the sensing unit 273 corresponds to the predetermined distance value, the controller 270 may display first information 910 indicating that there is notification information corresponding to the first user in a partial area 901 of the display unit 280 while displaying the video data on the display unit 280.

Next, the controller 270 of the multimedia device 200 may activate the camera (in some embodiments, the camera has already been activated). When it is detected based on an image obtained by the camera that eyes of the first user do not gaze the partial area 901, or when it is detected based on the image obtained by the camera that the amount of time in which the eyes of the first user gaze the partial area 901 is less than a predetermined amount of time, the controller 270 of the multimedia device 200 may eliminate the first information 910 from the partial area 901 after elapse of a predetermined time.

Figure 10:
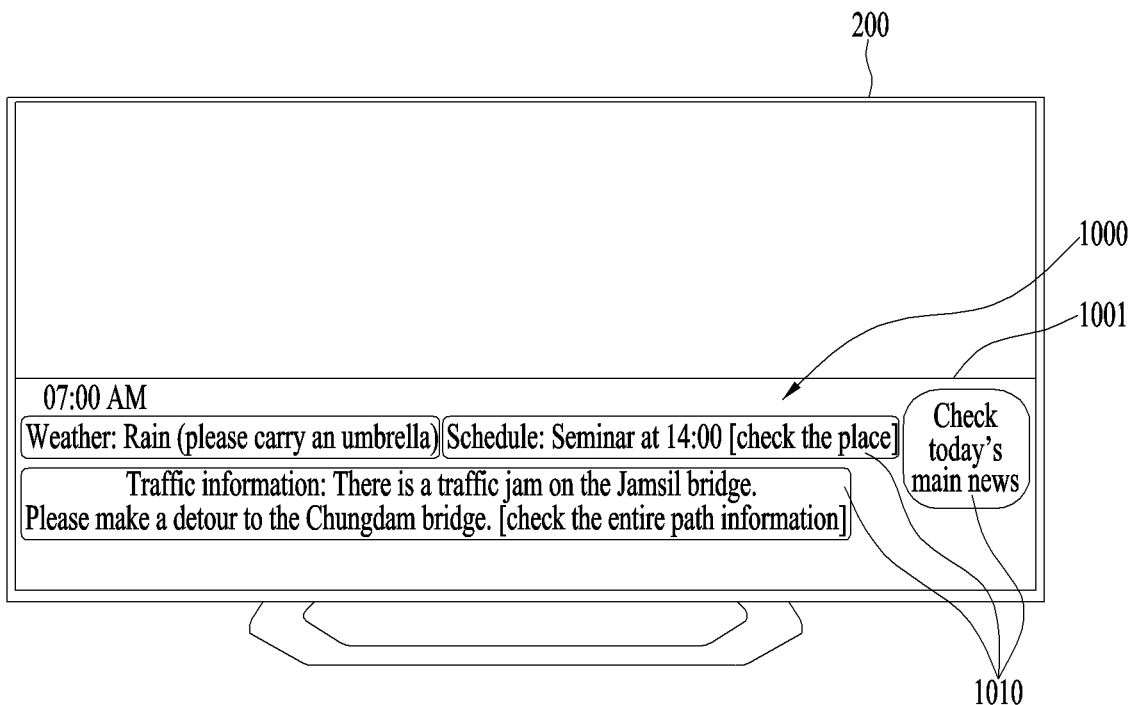
FIG. 10 is a diagram illustrating a still further example of a method for providing notification information for each user at the multimedia device according to one embodiment of the present invention.

FIG. 10 is a diagram illustrating a still further example of a method for providing notification information for each user at the multimedia device according to one embodiment of the present invention. To avoid redundant description, the features described above with reference to FIGS. 4 to 9 will not be described again.

When the multimedia device 200 is off, the controller 270 of the multimedia device 200 enters the standby mode. In addition, when the user recognized on the basis of the user information obtained by the sensing unit 273 corresponds to the first predetermined user, and when the distance information to the user obtained by the sensing unit 273 corresponds to the predetermined distance value, the controller 270 may activate a partial area 1001 of the display unit 280 and then display notification information 1000 corresponding to the first user of the collected notification information in the partial area 1001. In this case, the controller 270 of the multimedia device 200 may extract the notification information corresponding to the first user based on at least one of the current time, date, and day of the collected notification information.

For example, when today is a weekday, and when the current time is time to get ready for work predetermined by the first user, the controller 270 of the multimedia device 200 may extract notification information that the first user can use before going to work from the collected notification information and then display the extracted notification information 1000 in the partial area 1001. That is, the notification information 1000 may include weather information, calendar information of the first user, traffic information, headline news information, etc.

As another example, when today is a weekend, and when the current time is before noon, the controller 270 of the multimedia device 200 may extract notification information that the first user can use at Sunday morning from the collected notification information and then display the extracted notification information in the partial area 1001. The information that the first user can use before going to work and the information that the first user can use at Sunday morning may be determined based on history information stored in the memory 240 of the multimedia device 200 or information received from the mobile terminal 100 of the first user (e.g., calendar information).

In some embodiments, at least part of the notification information 1000 may be selected. Specifically, the notification information 1000 displayed in the partial area 1001 may include a menu option 1010 for checking detailed information of the notification information, controlling a multimedia device 200's function corresponding to the notification information, or controlling an external device associated with the notification information (e.g., the mobile terminal 100 of the first user). Since details of the menu option 1010 are the same as described in FIG. 5, it will be omitted.

Meanwhile, according to an embodiment of the present invention, if a distance from the multimedia device to a user is greater than the predetermined value after notification information for each user is displayed on the multimedia device 200, the notification information may be continuously provided through a mobile terminal 100 corresponding to the user. Details will be described with reference to FIG. 11.

Figure 11:
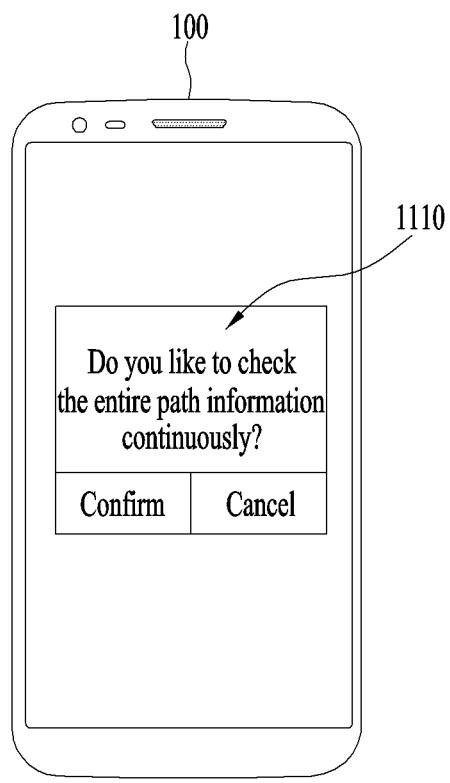
FIG. 11 is a diagram illustrating an example of a method for continuously providing notification information through a mobile terminal of a user according to a distance between the multimedia device and user when notification information for each user is displayed on the multimedia device according to one embodiment of the present invention.

FIG. 11 is a diagram illustrating an example of a method for continuously providing notification information through a mobile terminal of a user according to a distance between the multimedia device and user when notification information for each user is displayed on the multimedia device according to one embodiment of the present invention. To avoid redundant description, the features described above with reference to FIGS. 4 to 10 will not be described again.

The controller 270 of the multimedia device 200 may display notification information corresponding to the recognized user in a partial area of the display unit 280 in the standby mode. In addition, the controller 270 may sense a distance between the user and multimedia device 200 through the sensing unit 237 either periodically or a periodically.

When the distance between the user and multimedia device 200 exceeds the predetermined value, the controller 270 of the multimedia device 200 may transmit a first signal corresponding to the notification information, which displayed in the partial area of the display unit 280, through the wireless communication unit to the user's mobile terminal 100. The first signal may include the notification information or access information, an acquisition method, an acquisition path, and the like necessary for the mobile terminal 100 to obtain the notification information.

Based on the transmitted first signal, the controller 180 of the mobile terminal 100 may display, on the display unit 151, a notification message 1110 for the user to select whether to check the notification information through the mobile terminal 100.

When a confirm menu in the notification message 1110 is selected, the controller 180 of the mobile terminal 100 may display data corresponding to the notification information on the display unit 151.

According to the present embodiment, even when the user is out of home after being provided with the notification information through the multimedia device 200, the notification information can be continuously provided through the mobile terminal 100, thereby improving user convenience.

Meanwhile, according to an embodiment of the present invention, when displaying notification information for each user, the multimedia device 200 may change at least part of the notification information according to a distance between a user and the multimedia device 200. Details will be described with reference to FIG. 12.

Figure 12:
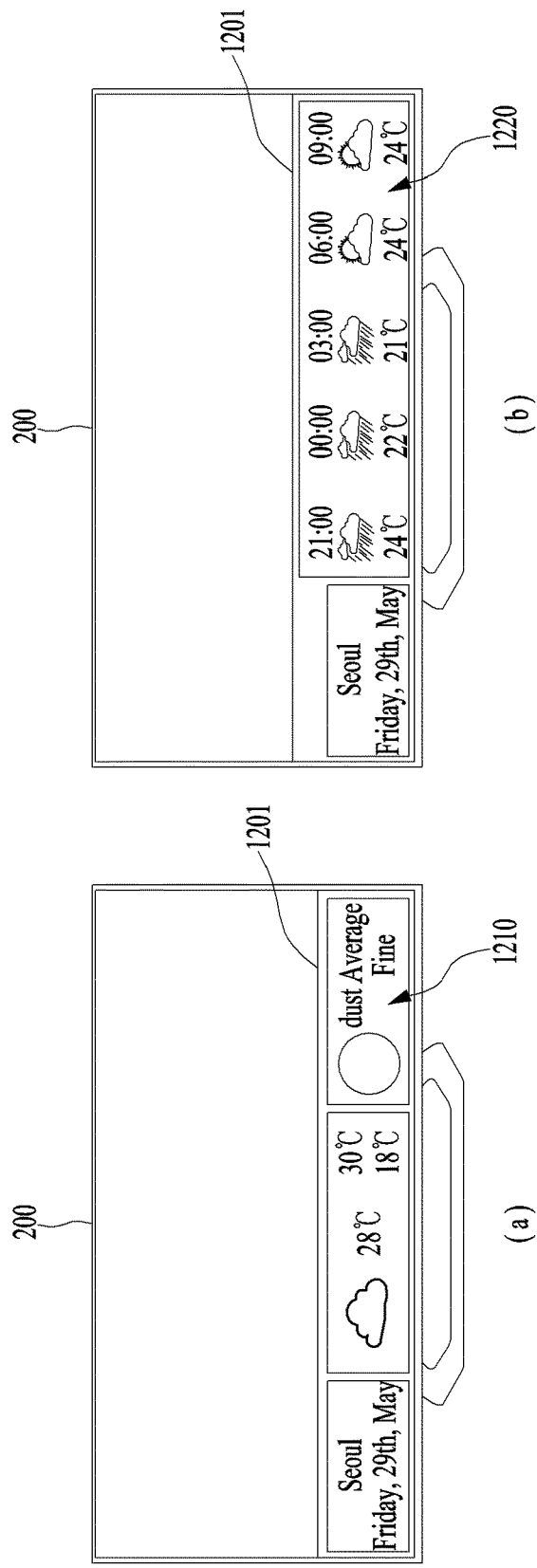
FIG. 12 is a diagram illustrating yet another example of a method for providing notification information for each user at the multimedia device according to one embodiment of the present invention.

FIG. 12 is a diagram illustrating yet another example of a method for providing notification information for each user at the multimedia device according to one embodiment of the present invention. To avoid redundant description, the features described above with reference to FIGS. 4 to 11 will not be described again.

When the multimedia device 200 is off, the controller 270 of the multimedia device 200 enters the standby mode. In addition, when the user recognized on the basis of the user information obtained by the sensing unit 273 corresponds to the first predetermined user, and when the distance information to the user obtained by the sensing unit 273 corresponds to the predetermined distance value, the controller 270 may activate a partial area 1201 of the display unit 280 and then display notification information corresponding to the first user of the collected notification information in the partial area 1201. In this case, at least part of the displayed notification information may be changed according to the obtained distance information to the user. For example, if a value of the obtained distance information to the user is increased within a predetermined range, the amount (volume) of the displayed notification information may be decreased. On the contrary, if the value of the obtained distance information to the user is decreased within the predetermined range, the amount (volume) of the displayed notification information may be increased. In the present invention, the displayed notification information is assumed to be today's weather information.

For example, referring to FIG. 12(a), when the value of the distance information to the user is greater than a first reference value within the predetermined range, the controller 270 of the multimedia device 200 may display first notification information 1210 in the partial area 1201. The first notification information 1210 may correspond to information on today's average weather.

As another example, referring to FIG. 12(*b*), when the value of the distance information to the user is smaller than the first reference value within the predetermined range, the controller 270 of the multimedia device 200 may display second notification information 1220 in the partial area 1201. The second notification information 1220 may correspond to information on today's detailed weather in each hour.

According to the present embodiment, when the distance between the user and multimedia device 200 is decreased, the multimedia device 200 may provide detailed information. On the contrary, when the distance between the user and multimedia device 200 is increased, the multimedia device 200 may provide simple information.

Meanwhile, according to an embodiment of the present invention, the multimedia device 200 may utilize information obtained from a user's image in displaying notification information for each user.

Figure 13:
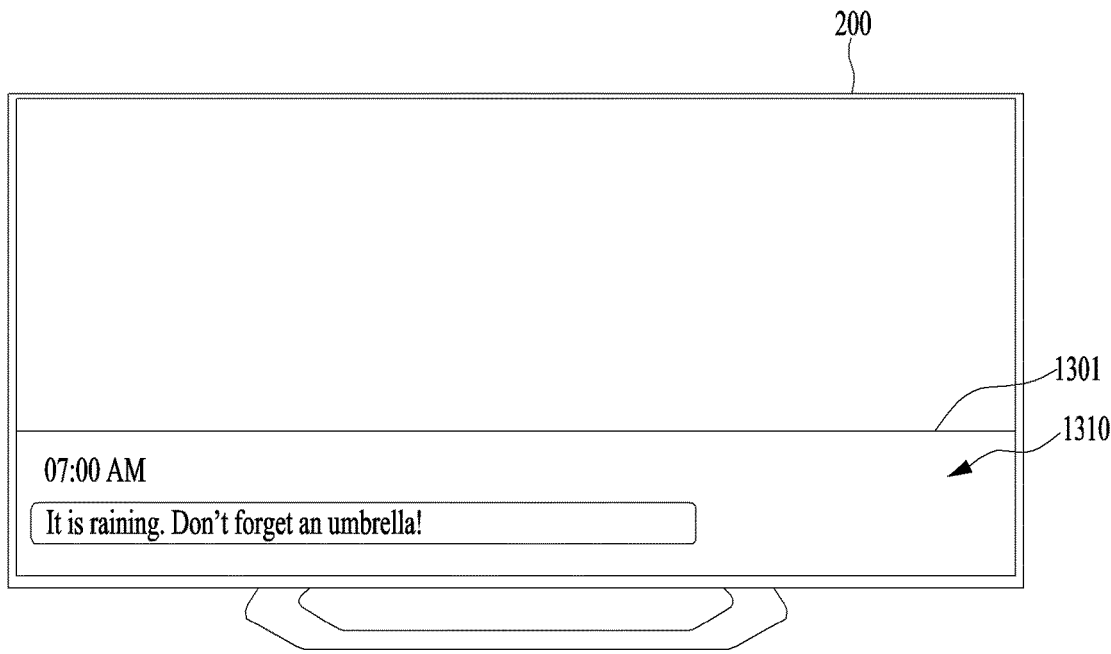
FIG. 13 is a diagram illustrating an example of a method for displaying notification information based on information obtained from a user's image at the multimedia device according to one embodiment of the present invention.

FIG. 13 is a diagram illustrating an example of a method for displaying notification information based on information obtained from a user's image at the multimedia device according to one embodiment of the present invention. To avoid redundant description, the features described above with reference to FIGS. 4 to 12 will not be described again.

When the multimedia device 200 is off, the controller 270 of the multimedia device 200 enters the standby mode. In addition, when the user recognized on the basis of the user information obtained by the sensing unit 273 corresponds to the first predetermined user, and when the distance information to the user obtained by the sensing unit 273 corresponds to the predetermined distance value, the controller 270 may activate a partial area 1301 of the display unit 280 and then display notification information 1310 corresponding to the first user of the collected notification information in the partial area 1301. In this case, the controller 270 of the multimedia device 200 may extract the notification information 1310 from information corresponding to the first user included in the collected notification information based on information obtained from an image of the first user. The image of the first user may be obtained by the camera included in the multimedia device 200 or the camera included in the gateway device in the house. Alternatively, the obtained image may be transmitted to the multimedia device 200.

For example, when it is raining, if it is determined based on the first user's image that the first user does not hold an umbrella, the controller 270 of the multimedia device 200 may display the notification information 1310 including information on the current weather and information that reminds the first user of an umbrella in the partial area 1301. In this case, the controller 270 of the multimedia device 200 may determine whether the first user holds an umbrella by applying an object detection method or an edge detection method to the first user's image.

Meanwhile, according to an embodiment of the present invention, a user may configure and control an environment of each space in a house using notification information provided by the multimedia device. Details will be described with reference to FIG. 14.

Figure 14:
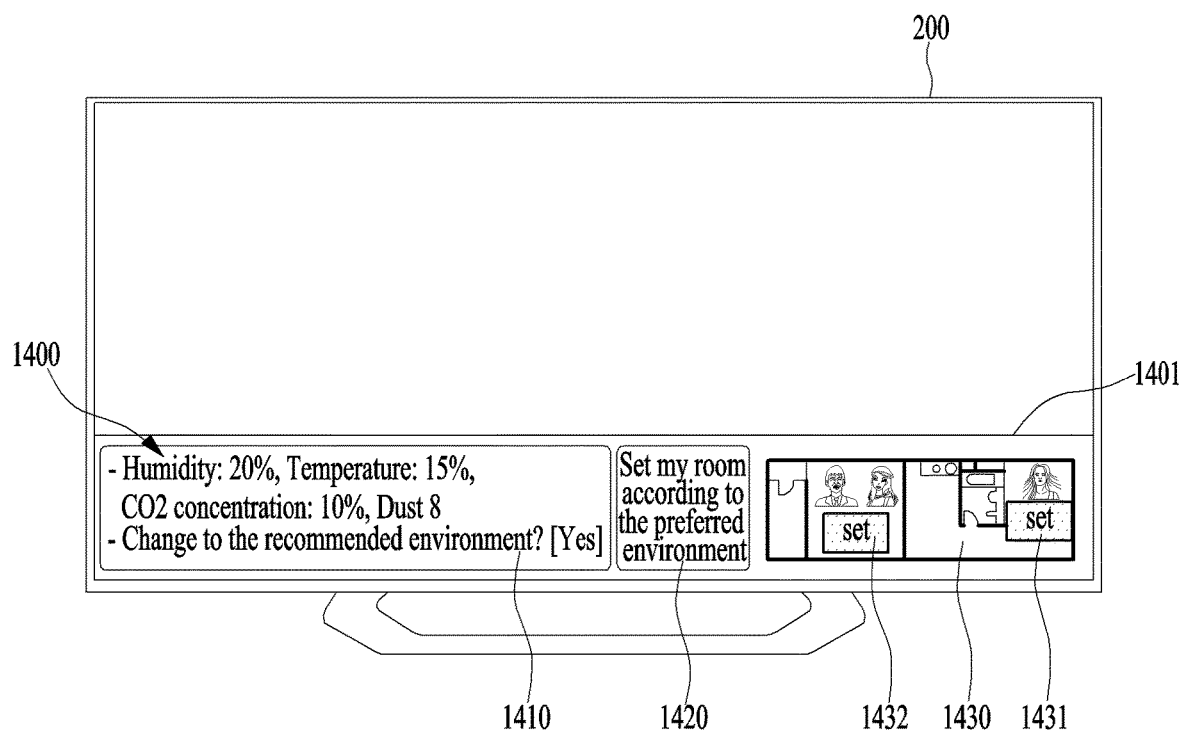
FIG. 14 is a diagram illustrating yet still another example of a method for providing notification information for each user at the multimedia device according to one embodiment of the present invention.

FIG. 14 is a diagram illustrating yet still another example of a method for providing notification information for each user at the multimedia device according to one embodiment of the present invention. To avoid redundant description, the features described above with reference to FIGS. 4 to 13 will not be described again.

When the multimedia device 200 is off, the controller 270 of the multimedia device 200 enters the standby mode. In addition, when the user recognized on the basis of the user information obtained by the sensing unit 273 corresponds to the first predetermined user, and when the distance information to the user obtained by the sensing unit 273 corresponds to the predetermined distance value, the controller 270 may activate a partial area 1401 of the display unit 280 and then display notification information 1400 corresponding to the first user of the collected notification information in the partial area 1401.

In the present embodiment, the notification information 1400 may include environment in formation (e.g., humidity, temperature, dust concentration, $CO_2$ concentration, etc.) based on data sensed by the sensing unit 237 of the multimedia device 200 or environment information transmitted from electronic devices in the house.

In some embodiments, the notification information 1400 may include a menu option 1410 for switching a home environment to a recommended environment. When receiving a command for selecting the menu option 1410, the controller 270 of the multimedia device 200 may transmit control signals (e.g., signals corresponding to predetermined environment configuration values) required for switching the home environment to the predetermined recommended environment to the electronic device in the house. Alternatively, when receiving the command for selecting the menu option 1410, the controller 270 of the multimedia device 200 may transmit the control signals required for switching the home environment to the predetermined recommended environment to the gateway device in the house. Thereafter, the gateway device may forward the control signals required for switching the home environment to the predetermined recommended environment to the electronic devices in the house. Here, the electronic devices in the house may include a humidifier, a dehumidifier, a boiler, an air cleaner, etc.

In addition, in some embodiments, the notification information 1400 may include a menu option 1420 for switching an environment of a space in the house corresponding to the first user (e.g., room of the first user) to a recommended environment or an environment preferred by the first user. When receiving a command for selecting the menu option 1420, the controller 270 of the multimedia device 200 may transmit control signals for switching the space in the house corresponding to the first user to the predetermined recommended environment or the first user's preferred environment, which is previously stored, to electronics device in the corresponding space.

Moreover, in some embodiments, the notification information 1400 may include a GUI 1430 for respectively changing environment configurations of a plurality of spaces in the house. For example, the GUI 1430 may include not only graphic images of the plurality of spaces in the house and user information corresponding to each of the spaces. Further, the GUI 1430 may include menu options 1431 and 1432 for configuring environments of the spaces. The first user may control the environment of each space or change the environment configuration value of each space using the menu options 1431 and 1432 in the GUI 1430.

Meanwhile, according to an embodiment of the present invention, the multimedia device can provide notification information customized for each user based on history information of each user using the multimedia device. Details will be described with reference to FIGS. 15 and 16.

Figure 15:
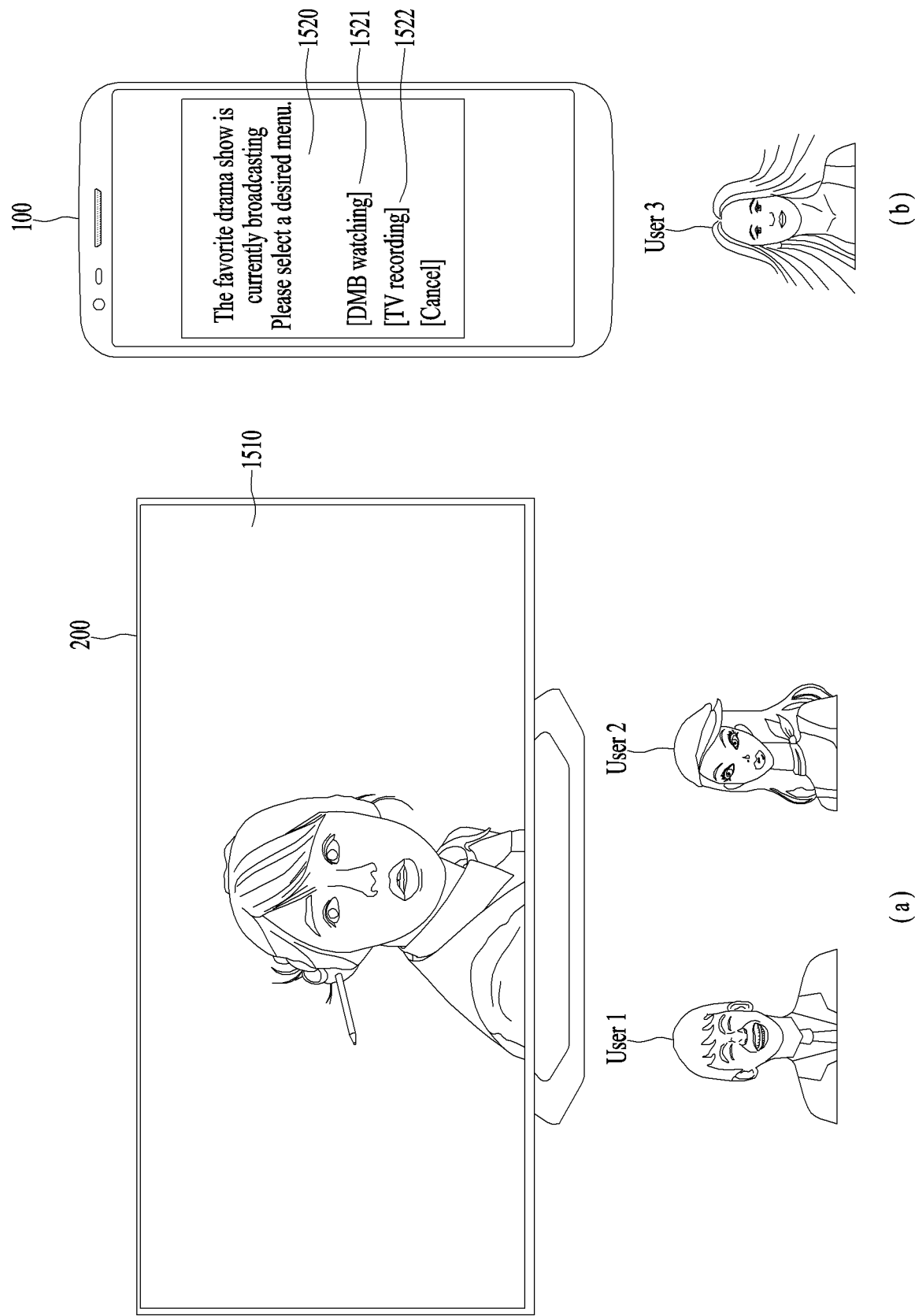
FIGS. 15 and 16 are diagrams illustrating examples of a method for providing information customized for each user based on history information of each user using the multimedia device according to one embodiment of the present invention.
Figure 16:
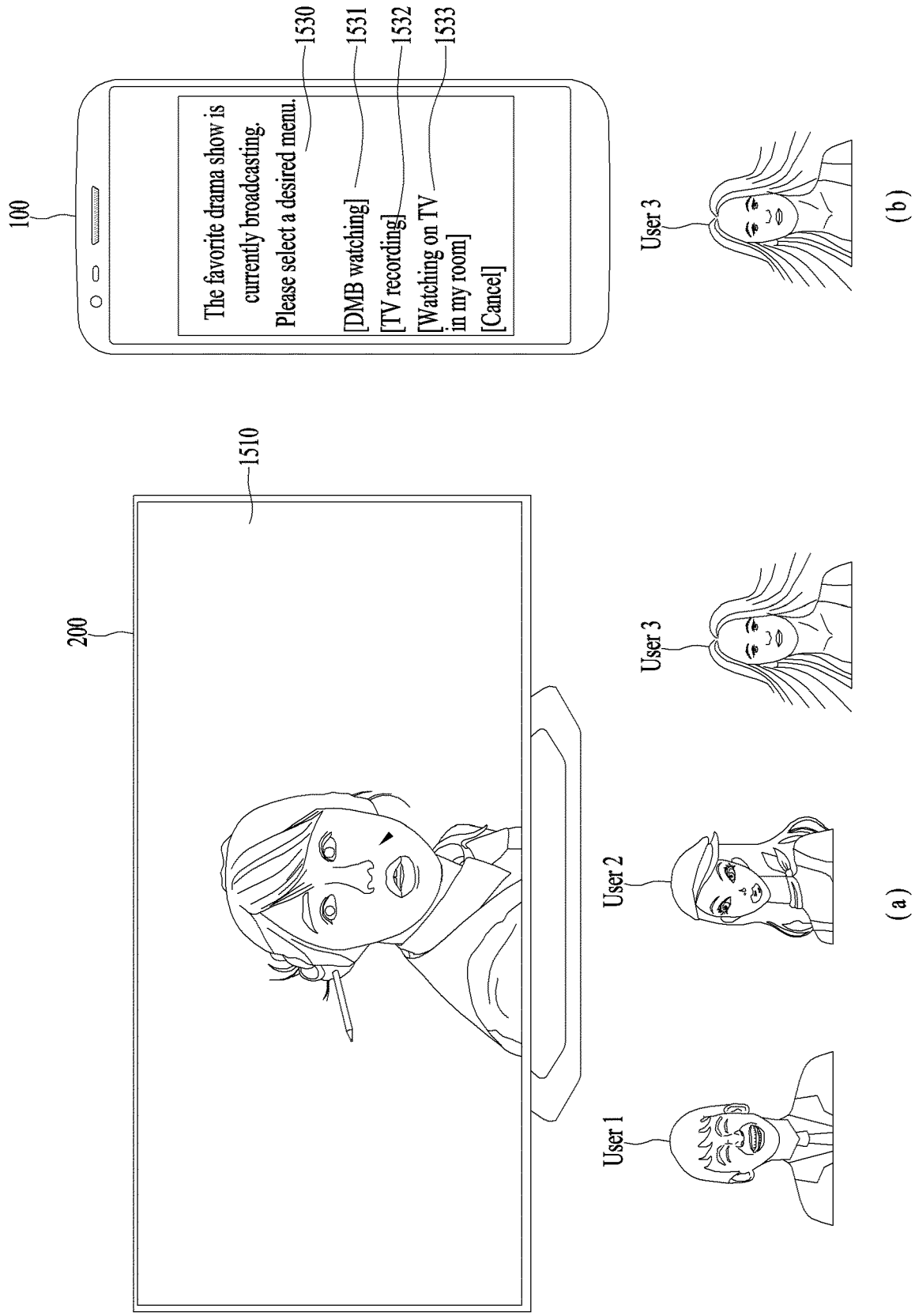

FIGS. 15 and 16 are diagrams illustrating examples of a method for providing information customized for each user based on history information of each user using the multimedia device according to one embodiment of the present invention.

The controller 270 of the multimedia device 200 displays, on the display unit 280, video data of a broadcast program included in a broadcast signal received by the receiver 205. Meanwhile, while the video data of the broadcast program is displayed on the display unit 280, the sensing unit 237 senses information of a user watching the broadcast program. Since the user information and the sensing method are the same as those described above with reference to FIG. 4, details will be omitted.

Next, the controller 270 of the multimedia device 200 stores the sensed user information in the memory 240 in response to the broadcast program. If video data 1510 of a broadcast program, which is the same as the broadcast program (i.e., broadcast program having the same title as the broadcast program) is display on the display unit 280 again after reception of the broadcast signal related to the broadcast program is completed, the controller 270 of the multimedia device 200 may sense information of a user watching the broadcast program again. If the re-sensed user information is different from the user information stored in the memory 240, the controller 270 of the multimedia device 200 may transmit a signal for providing a notification to a predetermined external device.

For example, based on the user information sensed by the sensing unit 237, it is assumed in the embodiment of FIG. 15 that user 1, user 2, and user 3 prefer the broadcast program. Thus, watching history information of the users 1 to 3 may be stored in the memory 240 in response to the broadcast program.

Referring to FIG. 15(a), when information of the user 3 corresponding to the user information stored in the memory 240 is not included in the re-sensed user information, the controller 270 of the multimedia device 200 may control a first signal for providing a notification about the broadcast program to the mobile terminal 100 corresponding to the user 3. Referring to FIG. 15(b), the controller 180 of the mobile terminal 100 may display, on the display unit 151, a notification message 1520 including the notification about the broadcast program based on the first signal. For example, the notification message 1520 may include at least one of a first menu option 1521 for displaying the broadcast program through a DMB application and a second menu option 1522 for recording the broadcast program through the multimedia device 200. When receiving a command for selecting the first menu Option 1521, the controller 180 of the mobile terminal 100 may execute the DM application and then display video data corresponding to the broadcast program received by the DMB application on the display unit 151. When receiving a command for selecting the second menu option 1522, the controller 180 of the mobile terminal 100 may transmit a signal corresponding to a command for recording the broadcast program to the multimedia device 200. According to the present embodiment, when a user who prefers to watch a specific broadcast program through the multimedia device 200 does not watch the specific broadcast program, the multimedia device 200 can provide notification information about the specific broadcast program to the user through the user's mobile terminal 100.

As another example, based on the user information sensed by the sensing unit 237, it is assumed in the embodiment of FIG. 16 that user 1 and user 2 prefer the broadcast program. Thus, watching history information of the users 1 and 2 may be stored in the memory 240 in response to the broadcast program.

Referring to FIG. 16(a), when information of user 3 that does not match the user information stored in the memory 240 is included in the re-sensed user information, the controller 270 of the multimedia device 200 may detect user 3's broadcast program watching history information from broadcast program watching history information per user, which is stored in the memory 240, and then transmit a second signal including broadcast program information corresponding to the detected watching history information to the mobile terminal 100 of the user 3. Referring to FIG. 16(b), based on the second signal, the controller 180 of the mobile terminal 100 may display a notification message 1530 including the broadcast program information corresponding to the detected watching history information. Here, the notification message 1530 may include information on a channel, source, and the like where the favorite broadcast program of the user 3 is broadcasted. For example, the notification message 1530 may include at least one of a first menu option 1531 for displaying the favorite broadcast program of the user 3 through the DMB application, a second menu option 1532 for recording the favorite broadcast program of the user 3 through the multimedia device 200, and a third menu option 1533 for displaying the favorite broadcast program of the user 3 through another multimedia device in the house.

Meanwhile, according to an embodiment of the present invention, it is possible to control functions of electronic device in the house through the multimedia device. Details will be described with reference to FIG. 17.

Figure 17:
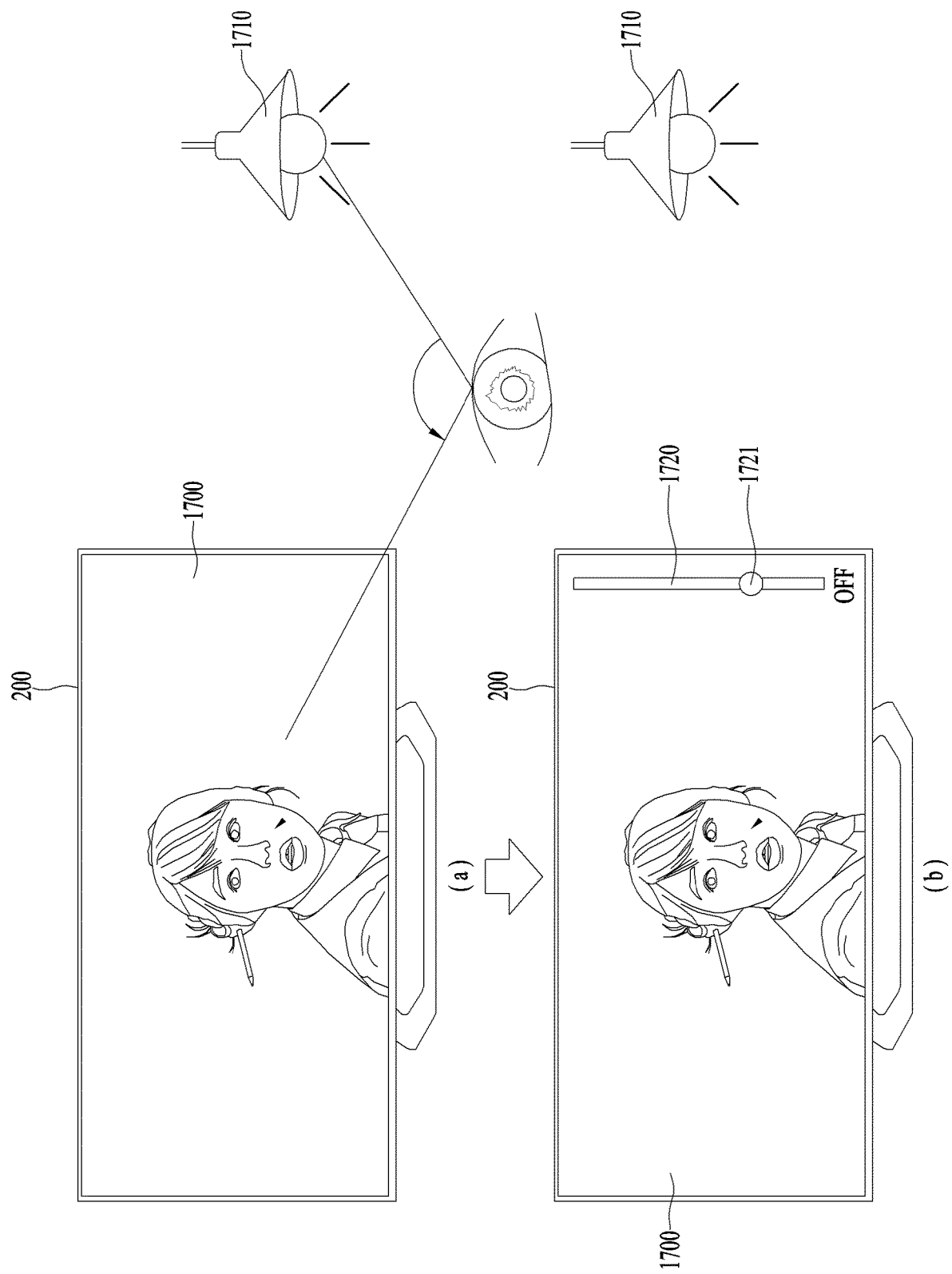
FIG. 17 is a diagram illustrating an example of a method for controlling functions of electronic devices in a house through the multimedia device according to one embodiment of the present invention.

FIG. 17 is a diagram illustrating an example of a method for controlling functions of electronic devices in the house through the multimedia device according to one embodiment of the present invention.

Referring to FIG. 17(a), the multimedia device 200 currently displays video data 1700 corresponding to prescribed content on the display unit 280. While the video data 1700 is displayed, the controller 270 of the multimedia device 200 may detect eyes of a user watching the prescribed content on the basis of an image obtained by the camera included in the sensing unit 237.

Based on the image, the controller 270 may detect that the user's eyes, which has gazed the video data 1700, move out of the video data 1700 and then face an electronic device in the house (e.g. a light source 1710). For example, the controller 270 may detect that the user's eyes gaze the light source 1710 based on the user's eyes and the light source 1710 included in the image. Thereafter, the controller 270 may detect that the user's eyes move out of the light source 1710 and then face the video data 1700 again.

Referring to FIG. 17(b), when the user's eyes move from the light source 1710 to the video data 1700 after moving from the video data 1700 to the light source 1710, the controller 270 may display a GUI 1720 for controlling a function of the light source 1710 (e.g., brightness control function) on the display unit 280. The GUI 1720 may include an indicator 1721 for adjusting the brightness of the light source 1710. The user may adjust the brightness of the light source 1710 by moving the indicator 1721 of the GUI 1710 through the remote controller or the mobile terminal 100 capable of controlling the multimedia device 200. For example, the user may turn up/down the brightness of the light source 1710 using a volume up/down button or channel up/down button included in the remote controller. In addition, the controller 270 may control a signal for adjusting the brightness of the light source 1710 to be transmitted to the light source 1710 based on a signal received from the remote controller or the mobile terminal 100.

In some embodiments, if a value of the brightness of the light source 1710 preferred by each user is stored, the controller 270 of the multimedia device 200 may identify a user based on data sensed by the sensing unit 237 and then automatically change the brightness of the light source 1710 according to the brightness value preferred by the identified user.

According to the above-described embodiments of the present invention, the multimedia device can provide information customized for each user in the standby mode. In addition, the multimedia device can also provide the information customized for each user in the ON state.

The above-described invention can be implemented in a program-recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy disks, optical data storage devices, and the like, for example and also include carrier-wave type implementations (e.g., transmission via Internet). Further, the computer may include the aforementioned controller. Therefore, the above embodiments are to be construed in all aspects as illustrative and not restrictive. The scope of the present invention should be determined by reasonable interpretation of the appended claims. In addition, the present invention covers the modifications and variations of this invention that come within the scope of the appended claims and their equivalents.

INDUSTRIAL APPLICABILITY

The present invention relates to a multimedia device and the invention has industrial applicability.

What is claimed is:

1. A multimedia device, comprising:
a notification information collection unit comprising at least one of a tuner, a network interface unit and an external device interface unit, which are configured to collect notification information from at least one of a broadcasting station, an external device, and an external server;
a wireless communication unit configured to obtain personal identification information of a user and distance information to an external device by communicating with the external device corresponding to the user; a display unit; and a controller configured to:
control the display unit based on the personal identification information, the distance information and the notification information,
enter a standby mode when the multimedia device is off,
determine the user to be a predetermined user if the obtained personal identification information from the wireless communication unit corresponds to personal identification information of the predetermined user, and
activate a partial area of the display unit and display notification information corresponding to the predetermined user of the collected notification information in the partial area when the predetermined user is determined and the obtained distance information corresponds to a predetermined distance value,
wherein the wireless communication unit obtains the distance information by detecting strength or delay time of a signal received from the external device.

2. The multimedia device of claim 1, wherein at least part of the notification information displayed in the activated partial area is changed according to a value of the obtained distance information.

3. The multimedia device of claim 1, wherein when receiving a command for selecting at least one piece of the notification information displayed in the activated partial area, the controller is configured to control a signal corresponding to the selected piece of notification information to be transmitted to the external device corresponding to the predetermined user.

4. The multimedia device of claim 1, wherein while displaying the notification information corresponding to the predetermined user, the controller is configured to control the wireless communication unit to re-obtain distance information, and wherein when the re-obtained distance information is out of the predetermined distance value, the controller is configured to stop display of the notification information corresponding to the predetermined user and deactivate the activated partial area.

5. The multimedia device of claim 1, further comprising:
a camera configured to sense eyes of the user,
wherein when the predetermined user is determined and the obtained distance information corresponds to the predetermined distance value, the controller is configured to activate a first area of the display unit and display first information indicating that the notification information corresponding to the predetermined user is present in the first area, and
wherein when the camera senses that the eyes of the user gaze the first area, the controller is configured to activate a second area adjacent to the first area and display the notification information corresponding to the predetermined user of the collected notification information in the first and second areas.

6. The multimedia device of claim 1, further comprising:
a camera configured to sense eyes of the user,
wherein when the predetermined user is determined and the obtained distance information corresponds to the predetermined distance value, the controller is configured to activate a first area of the display unit and display first information indicating that the notification information corresponding to the predetermined user is present in the first area, and
wherein the camera senses that the eyes of the user do not gaze the first area, the controller is configured to deactivate the first area after elapse of a predetermined time.

7. The multimedia device of claim 1, wherein the notification information displayed in the activated partial area is changed according to at least one of the current time, day, date, and season.

8. The multimedia device of claim 1, wherein the notification information displayed in the activated partial area includes a menu option for configuring an environment of a predetermined space, and wherein when receiving a command for selecting the menu option, the controller is configured to control a signal corresponding to an environment configuration value of the predetermined space to be transmitted to a predetermined external device.

9. The multimedia device of claim 1, wherein the external device corresponding to the user includes a mobile terminal.

10. The multimedia device of claim 3, wherein the signal includes at least one of a controlling command for the external device corresponding to the user and a request for checking the notification information through the external device.

11. A multimedia device, comprising:
a notification information collection unit comprising at least one of a tuner, a network interface unit and an external device interface unit, which are configured to collect notification information from at least one of a broadcasting station, an external device, and an external server;
a sensing unit configured to obtain user information and distance information to the user, the sensing unit comprising at least one of a camera, a proximity sensor and a wireless communication unit;
a display unit; and
a controller configured to control the display unit based on the user information, the distance information to the user and the notification information,
wherein the controller is further configured to:
enter a standby mode when the multimedia device is off,
determine the use to be a recognized user if the obtained user information from the sensing unit corresponds to a predetermined user,
activate a partial area of the display unit and display notification information corresponding to the recognized user of the collected notification information in the activated partial area when the recognized user is determined and the obtained distance information to the user by the sensing unit corresponds to a predetermined distance value, and
when receiving a command for selecting at least one piece of the notification information displayed in the activated partial area, transmit a signal corresponding to the selected piece of notification information displayed in the activated partial area to an external device corresponding to the recognized user.

12. The multimedia device of claim 11, wherein at least part of the notification information displayed in the activated partial area is changed according to a value of the obtained distance information to the user.

13. The multimedia device of claim 11, wherein while displaying the notification information corresponding to the recognized user, the controller is configured to control the sensing unit to re-obtain distance information to the user, and wherein when the re-obtained distance information is out of the predetermined distance value, the controller is configured to stop display of the notification information corresponding to the recognized user and deactivate the activated partial area.

14. The multimedia device of claim 11, wherein when the recognized user is determined and the obtained distance information to the user corresponds to the predetermined distance value, the controller is configured to activate a first area of the display unit and display first information indicating that the notification information corresponding to the recognized user is present in the first area, and wherein when the camera senses that eyes of the user gaze the first area, the controller is configured to activate a second area adjacent to the first area and display the notification information corresponding to the recognized user of the collected notification information in the first and second areas.

15. The multimedia device of claim 11, wherein when the recognized user is determined and the obtained distance information to the user corresponds to the predetermined distance value, the controller is configured to activate a first area of the display unit and display first information indicating that the notification information corresponding to the recognized user is present in the first area, and
wherein the camera senses that the eyes of the user do not gaze the first area, the controller is configured to deactivate the first area after elapse of a predetermined time.

16. A multimedia device, comprising:
a controller configured to enter a standby mode when the multimedia device is off;
a notification information collection unit configured to collect notification information from at least one of a broadcasting station, an external device, and an external server when the multimedia device enters the standby mode;
a sensing unit configured to obtain information of a user and distance information to the user when the multimedia device enters the standby mode; and
a display unit,
wherein when the user recognized on the basis of the obtained user information corresponds to a predetermined user and when the obtained distance information to the user corresponds to a predetermined distance value, the controller is configured to activate a partial area of the display unit and display notification information corresponding to the recognized user of the collected notification information in the activated partial area,
wherein the sensing unit comprises a camera configured to sense eyes of the user,
wherein when the user recognized on the basis of the obtained user information corresponds to the predetermined user and when the obtained distance information to the user corresponds to the predetermined distance value, the controller is configured to activate a first area of the display unit and display first information for providing the notification information in the first area, and
wherein when the camera senses that the eyes of the user gaze to the first area, the controller is configured to activate a second area adjacent to the first area and display the notification information corresponding to the recognized user of the collected notification information in the first and second areas.

* * * * *